US011244401B2

(12) United States Patent
Drennan, III et al.

(10) Patent No.: US 11,244,401 B2
(45) Date of Patent: Feb. 8, 2022

(54) OUTLIER SYSTEM FOR GROUPING OF CHARACTERISTICS

(71) Applicant: HARTFORD FIRE INSURANCE COMPANY, Hartford, CT (US)

(72) Inventors: Arthur Paul Drennan, III, West Granby, CT (US); Tracey Ellen Steger, Glastonbury, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 477 days.

(21) Appl. No.: 14/928,043

(22) Filed: Oct. 30, 2015

(65) Prior Publication Data

US 2017/0124659 A1 May 4, 2017

(51) Int. Cl.

*G06Q 40/08* (2012.01)
*G06Q 30/00* (2012.01)
*G06F 16/28* (2019.01)

(52) U.S. Cl.

CPC .......... *G06Q 40/08* (2013.01); *G06F 16/285* (2019.01); *G06Q 30/0185* (2013.01)

(58) Field of Classification Search

CPC ........ G06Q 40/08; G06Q 50/22; G06Q 40/00; G06Q 30/0185; G06F 16/285

See application file for complete search history.

(56) References Cited

U.S. PATENT DOCUMENTS 7,739,133 B1 6/2010 Hail et al.
7,966,204 B1 6/2011 Hail et al.
8,762,180 B2 6/2014 Ghani et al.
8,849,676 B2 * 9/2014 Goldstein ............ G10L 13/033 704/2
9,026,551 B2 5/2015 Drennan, III
9,069,725 B2 6/2015 Jones
9,111,212 B2 8/2015 Jones
2005/0028046 A1 2/2005 McArdle
2005/0120332 A1 * 6/2005 Martin .................. G06Q 10/10 717/105
2005/0128516 A1 6/2005 Tomita
2006/0136273 A1 * 6/2006 Zizzamia .............. G06Q 40/08 705/4

(Continued)

FOREIGN PATENT DOCUMENTS

AU 2014274609 A1 * 1/2015
WO WO-02098045 A2 * 12/2002 .......... G06F 16/283

OTHER PUBLICATIONS

Sutapat Thiprungsri and Miklos A. Vasarhelyi. Cluster Analysis for Anomaly Detection in Accounting Data: An Audit Approach. The International Journal of Digital Accounting Research vol. 11, 2011, pp. 69-84. (Year: 2011).*

*Primary Examiner* — Virpi H Kanervo
(74) *Attorney, Agent, or Firm* — Volpe Koenig

(57) ABSTRACT

A device and method is disclosed for automatically grouping data based on characteristics. The device and method include a communication interface for receiving data for component information, a storage medium for storing the received data, and a processor for performing an analysis on the received data to determine parameters included within the data and processing the data using correlations within the data to group or isolate data points. The correlations enable the processor to identify attributes associated with particular groups of the data.

29 Claims, 30 Drawing Sheets

(56) References Cited

U.S. PATENT DOCUMENTS

2007/0208579 A1* 9/2007 Peterson ............ G06Q 30/0631
379/71
2010/0169343 A1* 7/2010 Kenedy ............... G06F 16/9535
707/758
2011/0179066 A1* 7/2011 Cardno ................... G06F 16/00
707/769
2012/0173289 A1 7/2012 Pollard et al.
2012/0303389 A1* 11/2012 Friedman ............... G06Q 10/10
705/4
2013/0046570 A1* 2/2013 Miller .................. G06Q 10/063
705/7.11
2014/0001356 A1* 1/2014 Buhot ...................... G21K 7/00
250/307
2014/0074560 A1* 3/2014 B'Far ..................... G06Q 50/01
705/7.38
2014/0108074 A1* 4/2014 Miller .................... G06Q 10/00
705/7.11
2014/0114840 A1* 4/2014 Arnold ............... G06Q 20/4016
705/39
2015/0081324 A1 3/2015 Adjaoute
2015/0127595 A1 5/2015 Hawkins, II et al.
2015/0339364 A1* 11/2015 Aoki ...................... G06Q 30/01
707/737
2016/0048542 A1 2/2016 Gluzman Peregrine
2016/0127358 A1* 5/2016 Engelking ........... H04L 63/0861
713/156
2017/0017886 A1* 1/2017 Gao ....................... G06N 20/00

* cited by examiner

830

| Date | Model | LOB | Entity_Type | Entity_ID | Norm_Score | Holdback |
|---|---|---|---|---|---|---|
| 6/1/2014 | Subro | Auto | Claim | 12345 | 250 | No |
| 6/1/2014 | Large Loss | WC | Claim | 23456 | 800 | No |
| 6/1/2014 | Large Loss | WC | Claim | 34567 | 750 | No |
| 6/1/2014 | Large Loss | WC | Claim | 45678 | 300 | No |
| 6/1/2014 | Large Loss | WC | Claim | 67890 | 770 | Yes |
| 6/1/2014 | Large Loss | WC | Claim | 78901 | 500 | No |
| 6/1/2014 | Large Loss | WC | Claim | 89012 | 100 | No |
| 6/1/2014 | ALI | All | Agency | AA123 | 300 | No |

| Date | Model | LOB | Entity_Type | Entity_ID | Norm_Score | Holdback | |
|---|---|---|---|---|---|---|---|
| 6/1/2014 | Subro | Auto | Claim | 12345 | 250 | No | 2220 |
| 6/1/2014 | Large Loss | WC | Claim | 23456 | 800 | No | 2210 |
| 6/1/2014 | Large Loss | WC | Claim | 34567 | 750 | No | |
| 6/1/2014 | Large Loss | WC | Claim | 45678 | 300 | No | 2230 |
| 6/1/2014 | Large Loss | WC | Claim | 67890 | 770 | Yes | 2240 |
| 6/1/2014 | Large Loss | WC | Claim | 78901 | 500 | No | 2250 |
| 6/1/2014 | Large Loss | WC | Claim | 89012 | 100 | No | 2260 |
| 6/1/2014 | ALI | All | Agency | AA123 | 300 | No | 2270 |

FIGURE 22

| Date | Model | LOB | Entity_Type | Entity_ID | Norm_Score | Holdback |
|---|---|---|---|---|---|---|
| 6/1/2014 | Subro | Auto | Claim | 12345 | 250 | No |
| 6/1/2014 | Large Loss | WC | Claim | 23456 | 800 | No |
| 6/1/2014 | Large Loss | WC | Claim | 34567 | 750 | No |
| 6/1/2014 | Large Loss | WC | Claim | 45678 | 300 | No |
| 6/1/2014 | Large Loss | WC | Claim | 67890 | 770 | Yes |
| 6/1/2014 | Large Loss | WC | Claim | 78901 | 500 | No |
| 6/1/2014 | Large Loss | WC | Claim | 89012 | 100 | No |
| 6/1/2014 | ALI | All | Agency | AA123 | 300 | No |

FIGURE 23

| Date | Model | LOB | Entity Type | Entity ID | Norm Score | Holdback |
|---|---|---|---|---|---|---|
| 6/1/2014 | Subro | Auto | Claim | 12345 | 250 | No |
| 6/1/2014 | Large Loss | WC | Claim | 23456 | 400 | No |
| 6/2/2014 | Large Loss | WC | Claim | 34567 | 200 | No |
| 6/30/2014 | ALL | All | Agency | AA1234 | 300 | No |
| 6/30/2014 | Large Loss | WC | Claim | 45678 | 750 | Yes |
| 6/30/2014 | Large Loss | WC | Claim | 23456 | 700 | No |
| 7/1/2014 | Large Loss | WC | State | CA | 500 | No |
| 7/1/2014 | Large Loss | WC | Industry | 2215 | 350 | No |

FIGURE 24

| Date | Model | LOB | Entity Type | Entity ID | Norm Score | Holdback |
|---|---|---|---|---|---|---|
| 6/1/2014 | Subro | Auto | Claim | 12345 | 250 | No |
| 6/1/2014 | Large Loss | WC | Claim | 23456 | 700 | No |
| 6/1/2014 | Large Loss | WC | Claim | 34567 | 200 | No |
| 6/1/2014 | Fraud | WC | Claim | 23456 | 650 | No |
| 6/1/2014 | ALL | All | Agency | AA1234 | 300 | No |
| 6/1/2014 | Large Loss | WC | Claim | 45678 | 750 | Yes |
| 6/1/2014 | Large Loss | WC | Claim | 56789 | 700 | No |
| 6/1/2014 | Large Loss | WC | State | CA | 500 | No |
| 6/1/2014 | Large Loss | WC | Industry | 2215 | 350 | No |

FIGURE 25

| Date | Model | LOB | Entity Type | Entity ID | Norm Score | Holdback |
|---|---|---|---|---|---|---|
| 6/1/2014 | Large Loss | WC | Claim | 12345 | 250 | No |
| 6/2/2014 | Large Loss | WC | Claim | 23456 | 700 | Yes |
| 6/3/2014 | Large Loss | WC | Claim | 34567 | 200 | No |
| 6/4/2014 | Large Loss | WC | Claim | 23456 | 650 | No |
| 6/5/2014 | Large Loss | WC | Claim | 45678 | 300 | No |
| 6/6/2014 | Large Loss | WC | Policy | BK1234 | 420 | No |
| 6/7/2014 | Large Loss | WC | Policy | BK2345 | 318 | No |
| 6/8/2014 | Large Loss | WC | Policy | BK3456 | 180 | No |
| 6/9/2014 | Large Loss | All | Agency | AA1234 | 350 | No |

FIGURE 26

OUTLIER SYSTEM FOR GROUPING OF CHARACTERISTICS

FIELD OF INVENTION

The present invention is related to an outlier system for grouping of characteristics and a universal repository for holding repeatedly accessible information.

BACKGROUND

An entity, such as an insurance company, may want to analyze or "mine" large amounts of data. For example, an insurance company might want to analyze tens of thousands of insurance claim files to look for patterns (e.g., a particular type of injury has occurred more frequently for employees who work in a particular industry). An entity might analyze this data in connection with different types of applications, and, moreover, different applications may need to analyze the data differently. For example, the term "IV" might referent to an "Insured Vehicle" when it appears in an automobile accident report and to "Intra-Venous" when it appears in a medical file. It can be difficult to identify patterns across such large amounts of data and different types of applications. In addition, manually managing the different needs and requirements (e.g., different business logic rules) associated with different applications can be a time consuming and error prone process. As a result, it would be desirable to provide systems and methods for efficiently and accurately preparing data for analysis, integrating the data to the workflow of the business, and inputting rules of users.

SUMMARY

A device and method for automatically grouping data based on characteristics. The device and method include a communication interface for receiving data for component information, a storage medium for storing the received data, and a processor for performing an analysis on the received data to determine parameters included within the data and processing the data using correlations within the data to identify data point having common attributes, wherein the data is identified based on a plurality of correlations constructed within the data based on the attributes indicative of at least an event, person, place, and thing included within the data, wherein the correlations enable the processor to identify the attributes associated with particular groups of the data based on groupings of the attributes and the relative separation an attribute grouping is from typical groupings of those attributes, and wherein the correlations become additional data output via the communication interface to enable analytics to be modeled on the data.

A device and method is disclosed for automatically grouping data based on characteristics. The device and method include a communication interface for receiving data for component information, a storage medium for storing the received data, and a processor for performing an analysis on the received data to determine parameters included within the data and processing the data using correlations within the data to group or isolate data points. The correlations enable the processor to identify attributes associated with particular groups of the data.

A device and method are described for universally repositing repeatedly accessible information within the workflow of a business. The device and method includes a communication interface for receiving input data from a plurality of devices, wherein the received input data includes analytics incorporated within the data, a storage medium for storing data based on analytics performed on the data, the storage medium further storing instructions adapted to be executed by the processor, and a processor executing the instructions stored on the storage medium to run models on the stored data, and based on defined criteria produce a ranking in the data and store the data with the associated ranking. The communications interface publishes the associated ranking with the data to allow access to the accessible information.

A system for evaluating data to support multiple insurance business applications is disclosed. The system includes a communication device to receive input data from a plurality of sources, wherein the received input data includes analytics incorporated within the data, a processor coupled to the communication device, and a storage device in communication with the processor and storing instructions adapted to be executed by the processor. The instructions predictively model the data to represent the data within a workflow of the business, and publish scores to tie data together and allow access to the multiple insurance business applications.

A system for evaluating data is also provided. The system includes a communication device to receive input data from a plurality of sources, a processor coupled to the communication device, and a storage device in communication with the processor and storing instructions adapted to be executed by the processor, The instructions identify and derive characteristics of the data, plot the identified and derived characteristics, determine groupings of data, profile the determined groupings of data, and generate referrals based on inclusion in a group.

BRIEF DESCRIPTION OF THE DRAWINGS

A more detailed understanding may be had from the following description, given by way of example in conjunction with the accompanying drawings wherein:

FIG. 21 illustrates a data set associated with the scoring mart;

FIG. 22 illustrates an example batch lookup of scores within the scoring mart;

FIG. 23 illustrates an example batch lookup of scores within the scoring mart;

FIG. 24 illustrates an aspect of the scoring mart allowing identifying the speed of change based scores;

FIG. 25 illustrates an aspect of the scoring mart allowing a return of entities with more than one score;

FIG. 26 illustrates an aspect of the scoring mart allowing the aggregation of scores from one entity onto another entity;

DETAILED DESCRIPTION OF THE EMBODIMENTS

An enterprise may want to analyze or "mine" large amounts of data, such as text data, images, documents, and voice data that may be received from various sources. By way of example, an insurance company might want to analyze tens of thousands of insurance claim text files including images that may be included with a claim to look for patterns (e.g., to find patterns of factors that may help indicate a likely recovery period length will be associated with a particular type of injury). An entity might analyze this data in connection with different types of applications and that different applications may need to analyze the data differently. An outlier engine may be used analyze the data to determine data points that may fit with other data points and be grouped together and/or determine data points that do not fit with other data points. Based on these grouping or exclusions, characteristics may be identified and derived from the data. A scoring mart may be used to provide integration into the workflow and input rules/business rules of users.

A system for evaluating data to support multiple insurance business applications is disclosed. The system includes a communication device to receive input data from a plurality of sources, wherein the received input data includes analytics incorporated within the data, a processor coupled to the communication device, and a storage device in communication with the processor and storing instructions adapted to be executed by the processor. The instructions predictively model the data to represent the data within a workflow of the business, and publish scores to tie data together and allow access to the multiple insurance business applications.

A system for evaluating data is also provided. The system includes a communication device to receive input data from a plurality of sources, a processor coupled to the communication device, and a storage device in communication with the processor and storing instructions adapted to be executed by the processor, The instructions identify and derive characteristics of the data, plot the identified and derived characteristics, determine groupings of data, profile the determined groupings of data, and generate referrals based on inclusion in a group.

Figure 1:
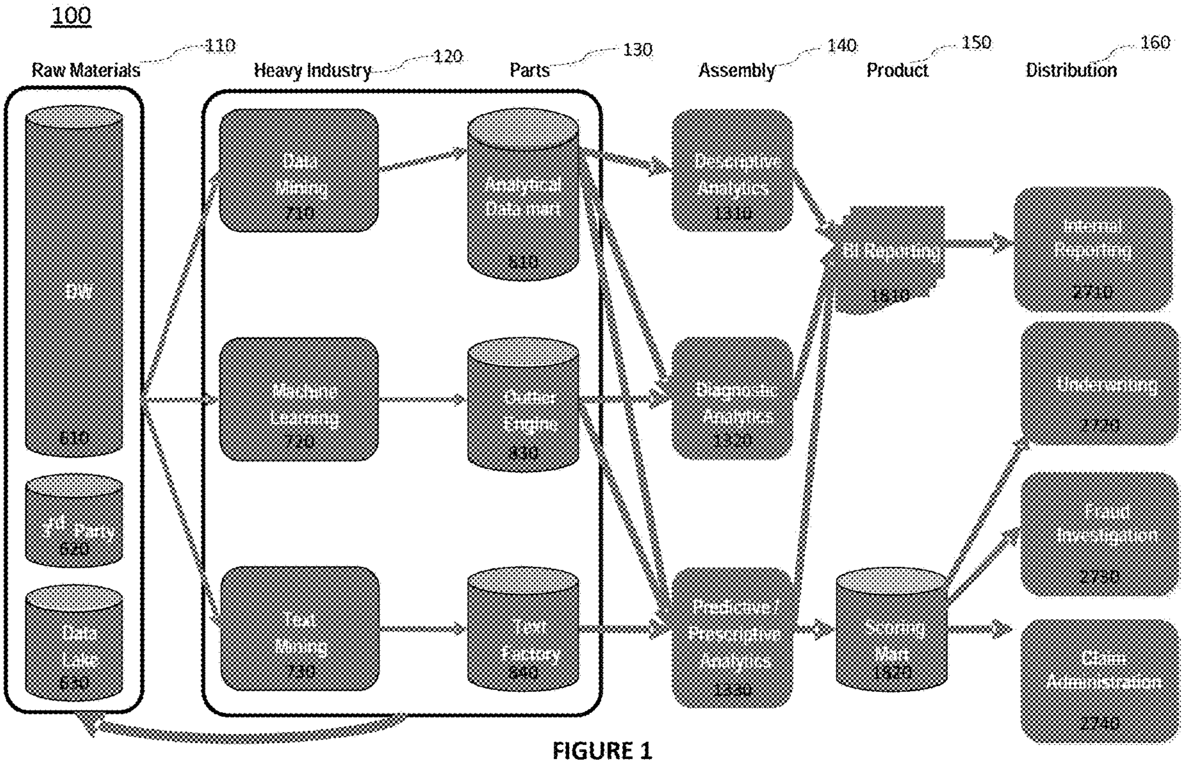
FIG. 1 illustrates a system block diagram of the insight supply chain.

FIG. 1 illustrates a system block diagram of the insight supply chain 100. System 100 includes raw materials 110, heavy industry 120, parts 130, assembly 140 product 150 and distribution 160 with names by way of analogy and not of requirement as discussed herein. As with a supply chain, system 100 begins with raw materials 110. These raw materials 110 may generally include data that may be in one form or another or a myriad of different forms. Raw materials 110 generally refer to data and other information that may be beneficial or provide insight to a business or corporate environment. Generally, the data may be stored within databases and other rigid structures, such as data warehouses 610, data lakes 630 that allow storage of varying forms of data including images, documents, and voice files, for example, and data supplied from third parties 620. Data contained within the insurance industry may include claim documents, policies, doctor reports, images of damage to vehicles, and the like. Data warehouses 610, data from third parties 620, and data lakes 630 are further described with respect to FIG. 6 below.

Raw materials 110, (the data), may be mined by heavy industry 120. Mining the data 710 includes the steps of taking the raw data and manipulating the data into a useable form. This manipulation may include formatting the data, relating the data, and structuring the data as well as other conventional data mining techniques.

Additionally or alternatively, the manipulation may include machine learning 720 which may include pattern recognition of the data. This may include pattern/sequence labeling for a claim contained within the data.

Other mining may include text mining 730. This type of mining includes generally unstructured mining of data in the form of text. Text mining may include analyzing the claim handler narrative where the narrative is written in a free form. Text mining, as will be described in more detail below, may include evaluating text data received from a myriad of potential sources, and aggregating and mapping the data to create composite text input data. Data mining 710, machine learning 720, and text mining 730 are further described with respect to FIG. 7 below.

After the data is mined by heavy industry 120, the data may be staged with parts 130. In a similar fashion to the manufacturing industry, parts 130 become the building blocks for further manufacturing. In the analysis being performed as described herein, parts 130 including the preparation, reorganization and management of the data. This staging may include reorganizing the data to accelerate access to the data. Data management 810 may be included in the staging. This may include claim notes, documents, social media and call transcripts consolidated based on a specific feature, such as consolidating all of the data surrounding a claim for a car crash. This may include texts by witnesses, police reports, 911 calls, and the like organized based on the automobile claim. Staging may also take the form of analytical analysis of data. This analysis may include the "what if" question, answer and associated analysis.

Staging may also include using an outlier engine 830 on the data to group or isolate data points, and based on relationships within the data conclude additional data about specific data points. For example, if a data point is grouped with other data points and the group includes high doctor bills associated with back injuries, the data point may have attributes associated with it based on the other members of the group. In this example, the grouping may allow a conclusion that the duration of doctor visits may also be above a threshold. Data management 810, outlier engine 830 and text factory 840 are further described with respect to FIG. 8 below.

Figure 2:
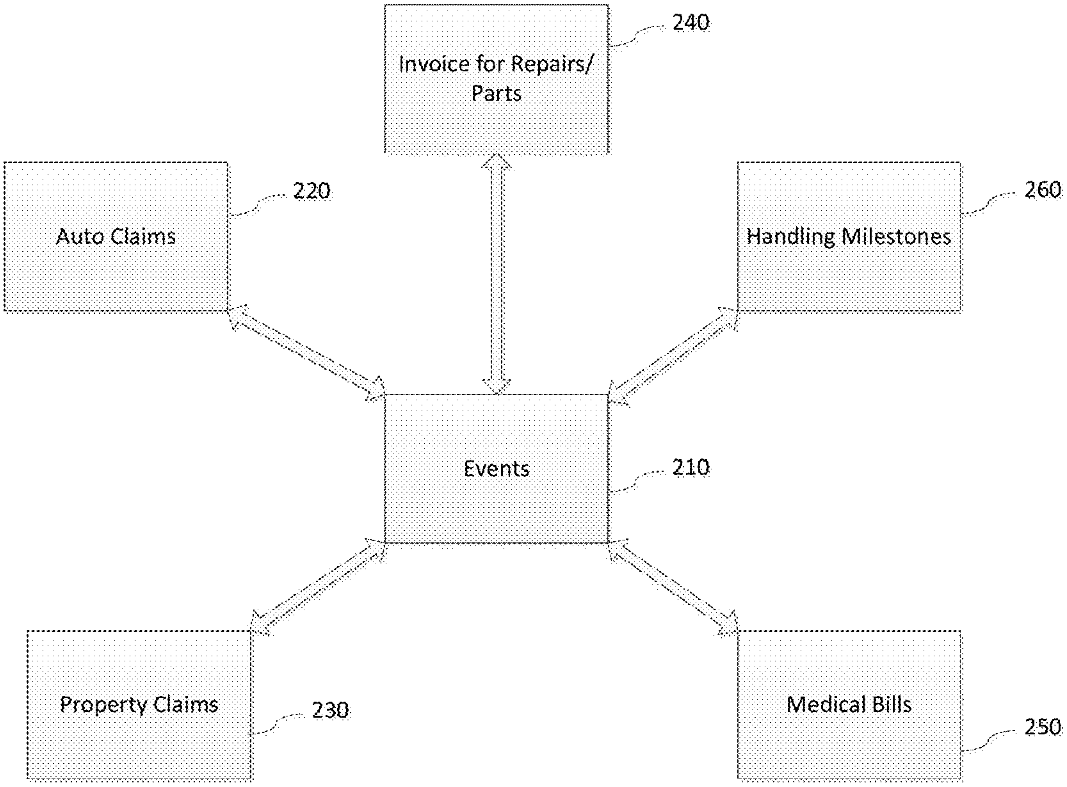
FIG. 2 illustrates data grouped based on exemplary events.

Staging the data includes grouping the mined observations by common central components. For example, and with reference to FIG. 2, there is illustrated data grouped based on exemplary events 210. As may be seen in FIG. 2, the events 210 may be grouped according to auto claims 220 property claims 230, invoices for repairs and parts 240, medical bills 250, and handling milestones 260. Each of auto claims 220 property claims 230, invoices for repairs and parts 240, medical bills 250, and handling milestones 260 may be anchored to a common event 210. Event 210 may be any meaningful concept within the company, for example.

Figure 3:
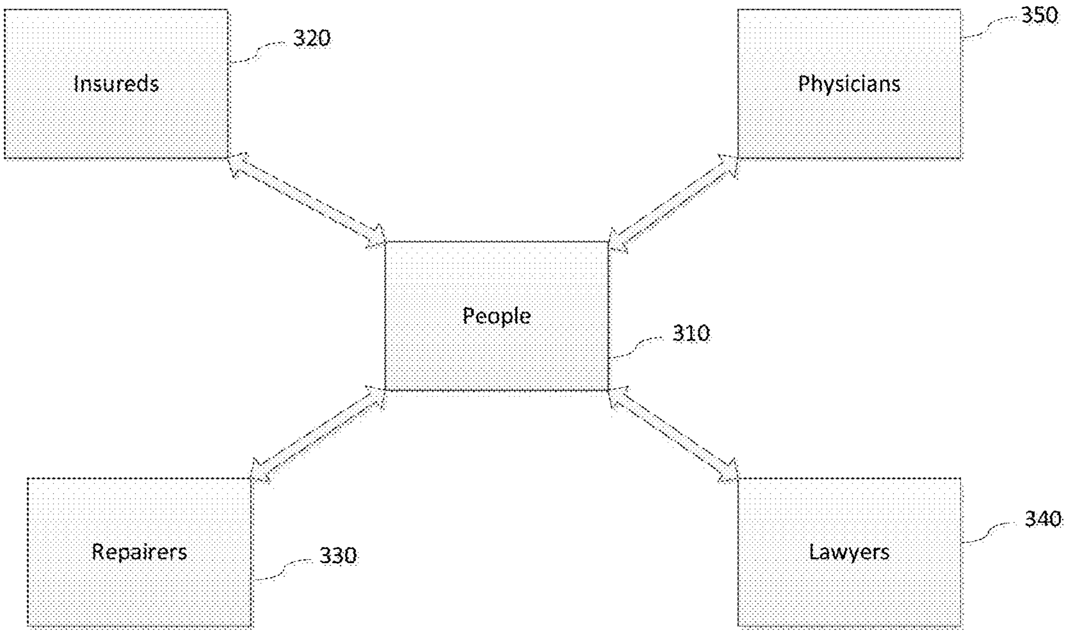
FIG. 3 illustrates data grouped based on exemplary actors.

Further in the example, and with reference to FIG. 3, there is illustrated data grouped based on exemplary actors 310. As may be seen in FIG. 3, people 310 may be grouped according to insureds 320, repairers 330, lawyers 340, and physicians 350. Each of insureds 320, repairers 330, lawyers 340, and physicians 350 may be anchored to a common person 310. Person 310 may be any meaningful concept within the company, for example.

Figure 4:
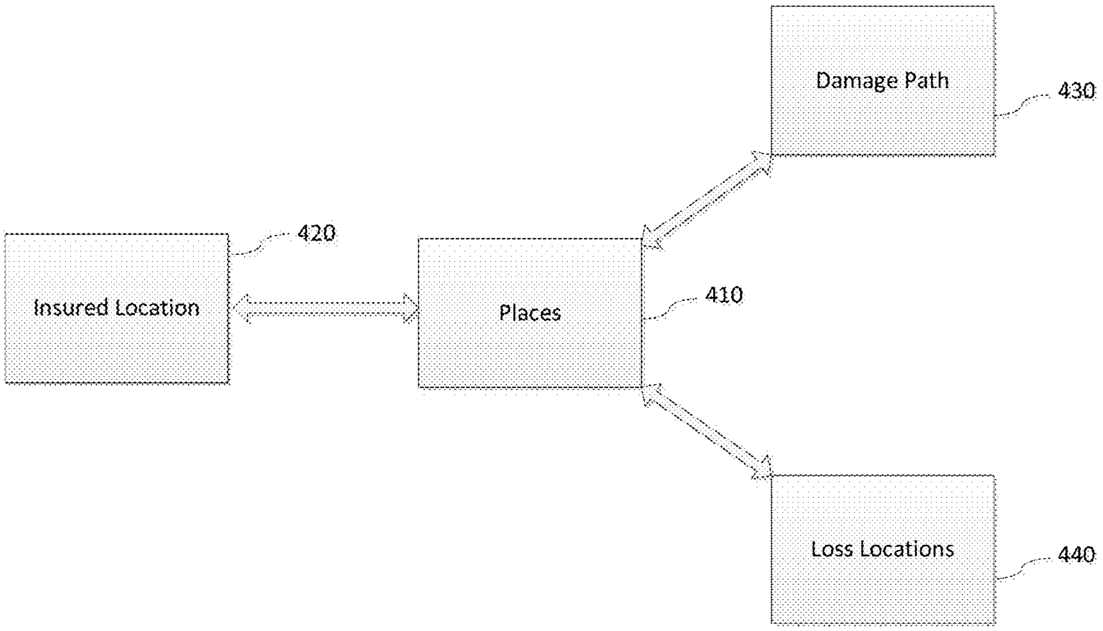
FIG. 4 illustrates data grouped based on exemplary places.

With reference to FIG. 4, there is illustrated data grouped based on exemplary places 410. As may be seen in FIG. 4, places 410 may be grouped according to insured location 420, damage path 430, and loss location 440. Each of insured location 420, damage path 430, and loss location 440 may be anchored to a common place 410. Place 410 may be any meaningful concept within the company, for example.

Figure 5:
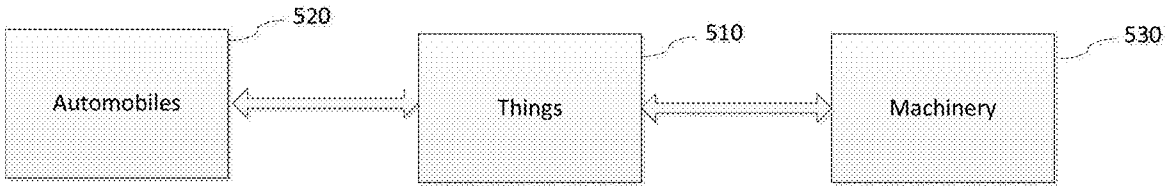
FIG. 5 illustrates data grouped based on exemplary things.

With reference to FIG. 5, there is illustrated data grouped based on exemplary things 510. As may be seen in FIG. 5, things 510 may be grouped according to automobiles 520 and machinery 530. Each of automobiles 520 and machinery 530 may be anchored to things 510. Thing 510 may be any meaningful concept within the company, for example.

Once the data is staged using parts 130, the data may be assembled 140. Assembly of the data includes performing analytics on the data. The analytics may include descriptive analytics 1310 including the management and reporting of the data. This may be relevant to the business intelligence team, the finance group, actuarial data, and product data, for example.

Analytics may also include diagnostics analytics 1320 on the data. Diagnostics analysis of the data may include the "why" and "what if" type of data analysis. This type of data analysis may be relevant in the insurance industry for actuarial forensics, for example.

Predictive/prescriptive analytics 1330 may also be performed on the data. This may include actions that should be taken to prevent something from happening. For example, in the insurance industry, severe medical issues may be lessened or eliminated by having yearly physicals. This type of analytics may be used in forensics research in the insurance industry, for example. Descriptive analytics 1310, diagnostic analytics 1320, and predictive/prescriptive analytics are further described with respect to FIG. 13 below.

Once the data is assembled, it may be packaged as a product 150. The product may include business intelligence reporting 1810 of the assembled data. For example, a trigger based on yearly physicals may provide a discount on the insurance premiums since severe medical issues are reduced by the occurrence of physicals. This type of reporting may include human delivery reporting, for example. Human delivery reporting is the reporting of metrics found in the data in a form to be used by a human. For example, after analyzing data the probability of an event occurring may be reported to a human so that that person may act in a certain way based on the probability. If the likelihood of getting in a car accident is 90% at a certain time, and that information is communicated to a human, it is likely that the human would not travel during that certain time so as to reduce the likelihood of being involved in an accident.

The assembled data may also be packaged via a scoring mart 1820. The scoring mart may provide a machine to machine product that integrates into the workflow of the insurance company. Such workflow input may include being input into rules of users and business rules, for example. Again using the physical example, if the business rules of issuing life insurance are input, a discount based on yearly physicals may automatically be implemented via the scoring mart 1820. Business intelligence reporting 1810 and scoring mart 1820 are further described with respect to FIG. 18 below.

After the product 150 is prepared, the data may be distributed 160 to the various corporate systems. These may include workflow platforms for fraud investigation 2730, underwriting 2720, and claims administration 2740, for example. Again with the physical example, the underwriting system may be provided the product that related to the use of yearly physicals providing a discount in life insurance premiums.

Distribution 160 may also include reporting the product through SharePoint or self-help. This may include a web interface on the insurance company's web page that allows insureds to access information that may provide information on reducing their insurance premiums. In the physical example discussed throughout, the web page may provide the insured information that directs the insured to seek yearly physicals in order to lower their life insurance premium. Internal reporting 2710, underwriting 2720, fraud investigation 2730, and claim administration 2740 are described below with respect to FIG. 27.

Figure 6:
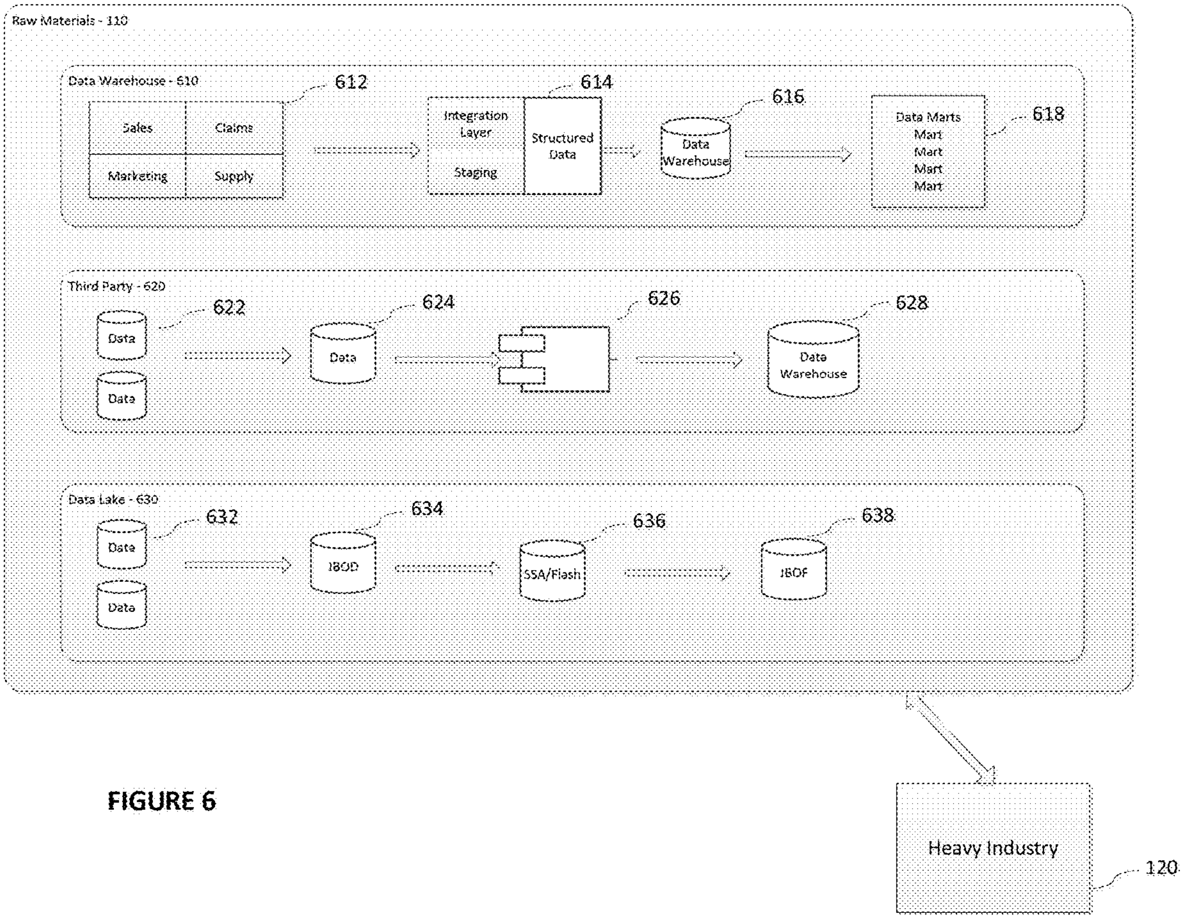
FIG. 6 illustrates several data storage elements for storing raw materials of FIG. 1.

For example, and with reference to FIG. 6, there is illustrated several data storage elements for storing raw materials 110 of FIG. 1. Raw materials 110 may be included in a data warehouse (DW) 610. DW 610, which may also be referred to as an enterprise data warehouse (EDW), is a central repository or repositories of integrated data from one or more disparate sources of data. DW 610 stores current and historical data and may be relied upon to create analytical reports for knowledge workers throughout an enterprise. DW 610 included structured data. Examples of reports could range from annual and quarterly comparisons and trends to detailed daily sales analyses. Generally, the data stored in DW 610 is uploaded from the operational systems, including data from marketing and sales. The data may pass through an operational data store for additional operations before it is used in DW 610. Often DW 610 refers to rigid structure data.

DW 610 may include data from portions of the company 612 that may include sales, claims, marketing, and supply, for example. This raw data may be stored in an integration layer 614 that prepares for staging. The integration layer 614 may output structured data for staging. The data may be held in a data warehouse 616 and stored in data marts 618.

Raw materials 110 may also include third party data 620. Third party data 620 may include any data that is purchased, or comes from outside the system 100. This may include data from external providers and may be aggregated from numerous websites. System 100 may be provided purchased third-party data 620 and data 220 may be shared within system 100.

Third party data 620 may include data that is stored in a data storage device 622. This data may be accumulated in an accessible data device 624. The data may be received via a communication link 626 and stored within the company in a data warehouse 628. Communication link 626 may provide a point-to-point portal or marketplace for third party data and/or aggregated data such as from an aggregator.

Raw materials 110 may also include data stored in a data lake 630. Data lake 630 may include a storage repository or a repository that holds a vast amount of data generally in its native format. While DW 610 stores data in files or folders, data lake 630 may use a flat architecture to store data. Each data element in data lake 630 may be assigned an identifier and tagged with a set of tags. When a business question arises, data lake 630 may be queried for relevant data, and that smaller set of data may then be analyzed to help answer the question. More specifically, data lake 630 houses data that is in large data pool in which the schema and data requirements are not defined until the data is queried.

Data lake 630 may include data storage 632 that holds the data. This data may then be stored in a bunch of disks (JBOD) 634. The data in bunch of disks 634 may be accessed and linked via SSA/flash 636 and stored within a bunch of flash memory (JBOF) 638.

Figure 7:
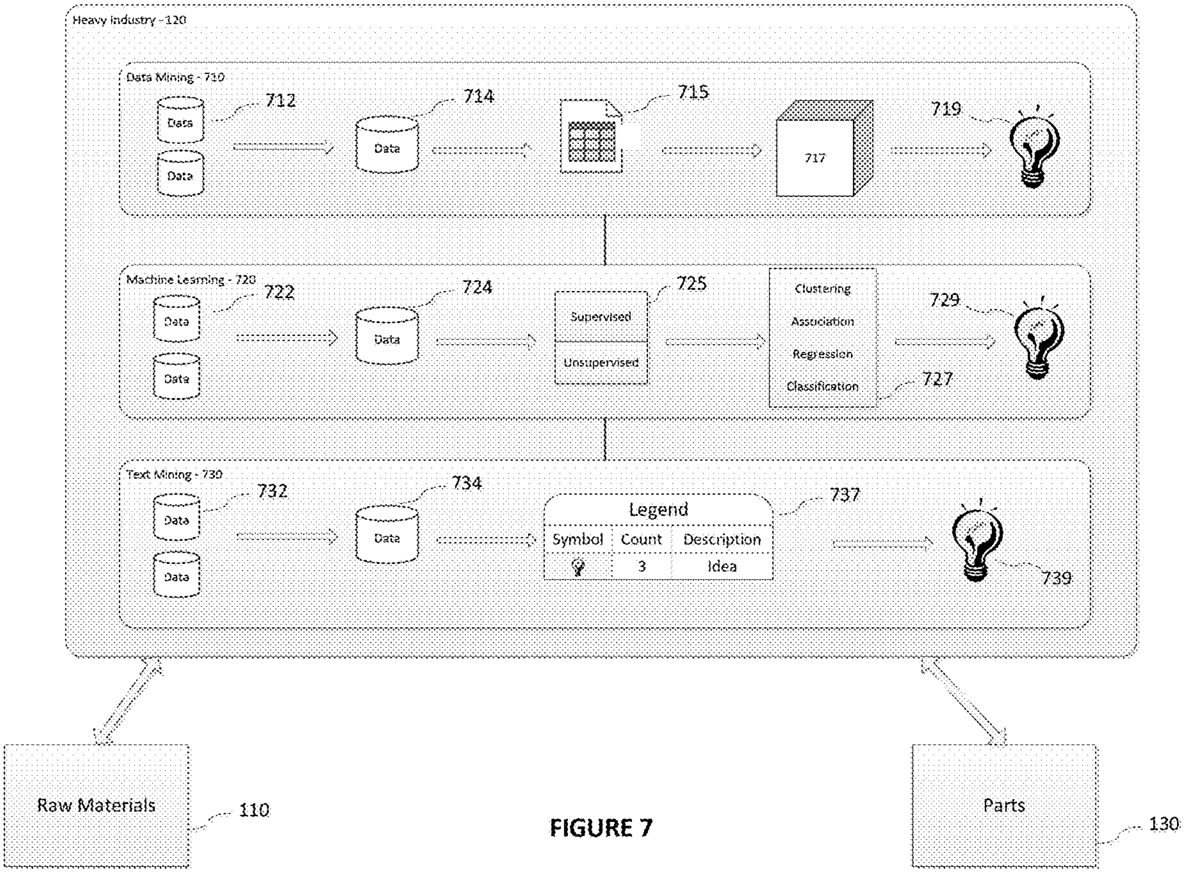
FIG. 7 heavy industry is illustrated as including data mining, machine learning and text mining.

Raw materials 110 are provided to or accessed by heavy industry 120. Referring now also to FIG. 7, heavy industry 120 is illustrated as including data mining 710, machine learning 720 and text mining 730.

Data mining 710 may include the classical types of data manipulation including relational data, formatted and structured data. Data mining 710 generally involves the extraction of information from raw materials 110 and transformation into an understandable structure. Data mining 710 may be performed on the raw materials 110. Data mining 710 may be used to analyze large quantities of data to extract previously unknown, interesting patterns such as groups of data records, unusual records, and dependencies. Data mining involves six common classes of tasks: 1) anomaly detection; 2) dependency modeling; 3) clustering; 4) classification; 5) regression, and 6) summarization.

Anomaly detection, also referred to as outlier/change/deviation detection may provide the identification of unusual data records, that might be interesting or data errors that require further investigation.

Dependency modeling, also referred to as association rule learning, searches for relationships between variables, such as gathering data on customer purchasing habits. Using association rule learning, associations of products that may be bought together may be determined and this information may be used for marketing purposes.

Clustering is the task of discovering groups and structures in the data that are in some way or another "similar", without using known structures in the data.

Classification is the task of generalizing known structure to apply to new data. For example, an e-mail program might attempt to classify an e-mail as "legitimate" or as "spam".

Regression attempts to find a function which models the data with the least error.

Summarization provides a more compact representation of the data set, including visualization and report generation.

Data mining 710 may include data stored in storage devices 712 and accumulated in data 714. This data may be mined and combined in database or table 715, for example. This data may then be correlated in a correlator 717. The correlated data may then be analyzed and reported 719.

Machine learning 720 may include performing pattern recognition on data or data sets contained within raw materials 110. This can be a review for pattern or sequence labels for claims for example. Machine learning explores the construction and study of raw materials 110 using algorithms that can learn from and make predictions on such data. Such algorithms operate using a model such as from example inputs in order to make data-driven predictions or decisions, rather than strictly using static program instructions.

Machine learning 720 may be performed using data stored on a storage device 722. This data may then be accumulated in a storage device 724. Machine learning may then be performed including supervised and unsupervised learning 725. This learning may include processing using clustering, associating, regression analysis, and classifying in a processor 727. The processed data may then be analyzed and reported 729.

Text mining 730 includes using text from raw materials 110 such as claim handling narrative. Generally, text mining 730 involves unstructured fields. Text mining 730 involves the process of deriving high-quality information from text. High-quality information is typically derived through the devising of patterns and trends through means such as statistical pattern learning. Text mining 730 generally involves structuring the input data from raw materials 110, deriving patterns within the structured data, and finally evaluation and interpretation of the output. Text analysis involves information retrieval, lexical analysis to study word frequency distributions, pattern recognition, tagging/annotation, information extraction, data mining techniques including link and association analysis, visualization, and predictive analytics. The overarching goal is, essentially, to turn text into data from raw materials 110 for analysis, via application of natural language processing (NLP) and analytical methods.

Text mining 730 may be performed on data stored on data storage devices 732. This data may be accumulated in data storage 734. The data may be scanned for words or sets of words and the word count may be monitored 737. The monitored and counted data may then be analyzed and reported 739.

A typical application is to scan a set of documents written in a natural language and either model the document set for predictive classification purposes or populate a database or search index with the information extracted.

Figure 8:
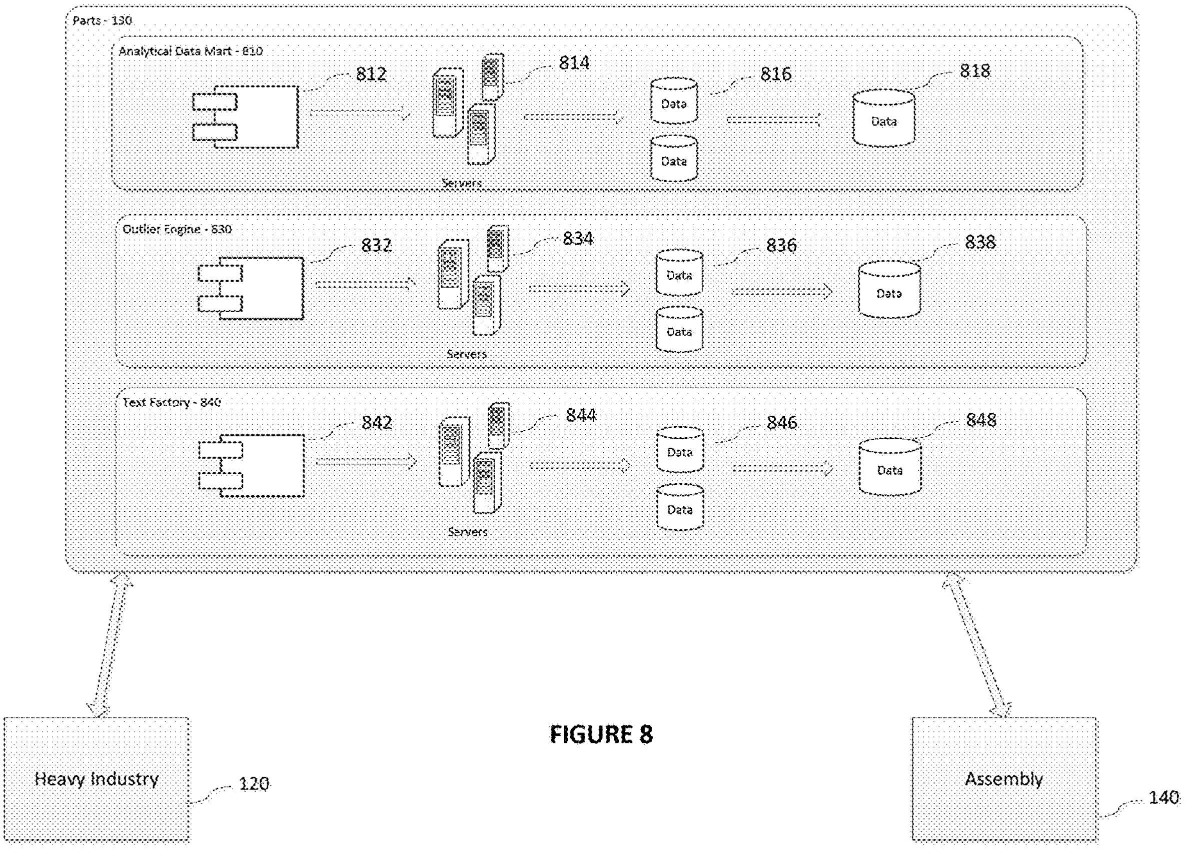
FIG. 8 illustrates that parts may include ADM, ARE, outlier engine and text factory.

Parts 130 may be the staging area for the analytics. For example, in parts 130 the data may be reorganized to accelerate those queries that are frequently requested. Parts 130 may include analytical data mart (ADM) 810, ARE 820, outlier engine 830 and text factory 840 as depicted in FIG. 8.

Analytical data mart, sometimes referred to as ADM, 810 may include an interface 812 for receiving data from heavy industry 120. This received data may be processed using processors and servers 814. The processed data, or unprocessed data, may be stored in repository storage 816. The data may then be accumulated on a data storage device 818.

Text factory 840 may include an interface 842 for receiving data from heavy industry 120. This received data may be processed as described herein using processors and servers 844. The processed data, or unprocessed data, may be stored in repository storage 846. The data may then be accumulated on a data storage device 848.

Outlier engine 830 receives data input from a machine learning unit 320 that establishes pattern recognition and pattern/sequence labels for a claim, for example. This may include billing, repair problems, and treatment patterns, for example. This data may be manipulated within outlier engine 830 such as by providing a multiple variable graph as will be described herein below. Outlier engine 830 may provide the ability to identify or derive characteristics of the data, find clumps of similarity in the data, profile the clumps to find areas of interest within the data, generate referrals based on membership in an area of interest within the data, and generate referrals based on migration toward and area of interest in the data. These characteristics may be identified or derived based on relationships with other data points that are common with a given data point. For example, if a data point is grouped with another data point, the attributes of the other data point may be derived to be with the data point. Such derivation may be based on clumps of similarity, for example. Such an analysis may be performed using a myriad of scores as opposed to a single variable.

Outlier engine 830 may include an interface 832 for receiving data from heavy industry 120. This received data may be processed as described herein using processors and servers 834. The processed data, or unprocessed data, may be stored in repository storage 836. The data may then be accumulated on a data storage device 838.

Figure 9:
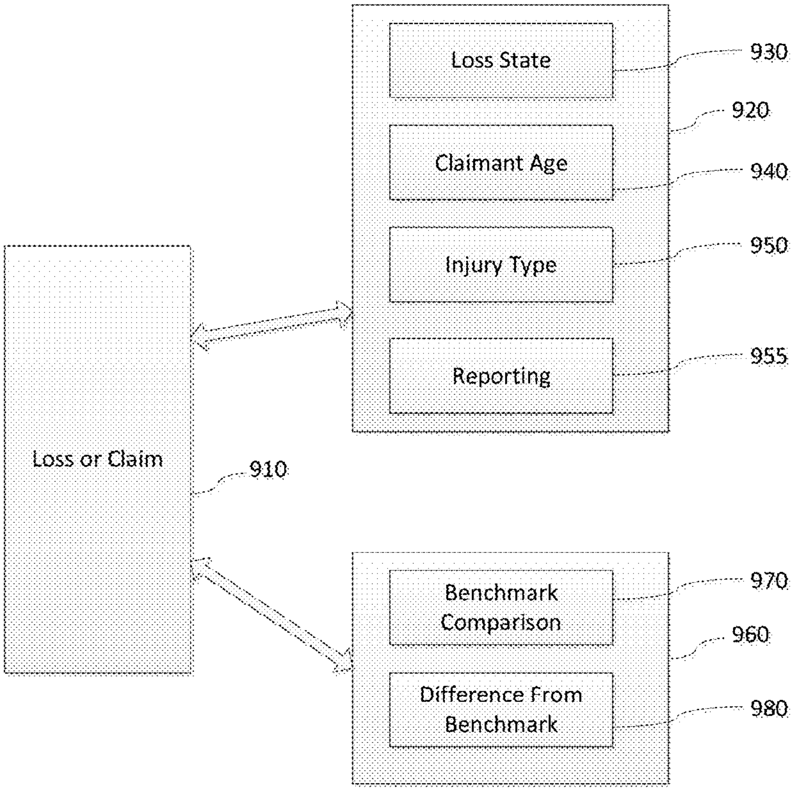
FIG. 9 illustrates elements of a predictive model.

Outlier analysis is generally performed on unweighted data with no variable to model to. This analysis may include identifying and/or calculating a set of classifying characteristics. Referring now to FIG. 9, in the case of a loss or claim 910 the classifying characteristics 920 may include loss state 930, claimant age 940, injury type 950, and reporting 955.

Additionally, these classifying characteristics 920 may be calculated by comparing a discrete observation 960 against a benchmark 970 and use the differences 980 as the characteristic. For example, the number of line items on a bill compared to the average for bills of the type may be determined. A ratio may be used so that if the average number of line items is 4 and a specific bill has 8, the characteristic may be the ratio, in the example a value of 2.

An algorithm may be used to group the target, such as claims for example, into sets with shared characteristics. Each group or cluster of data may be profiled and those that represent sets of observations that are atypical are labeled as outliers or anomalies. A record is made for each observation with all of the classifying characteristics, and values used to link the record back to the source data. The label for the cluster that the observation belonged to, whether it is normal or an outlier with a data of classification is recorded.

Outlier engine 830 may be used, for example, to utilize characteristics such as binary questions, claim duration, and peer group metrics to measure the relative distance from a peer group. This enables outlier engine 830 to identify claims that have high ratio and K means clustering.

For example, when performing invoice analytics on doctor invoices to check for conformance including determining if doctors are performing the appropriate testing, a ratio of duration of therapy to average duration therapy may be utilized. A score of 1 may be assigned to those ratios that are the same as the average, a score of 2 may be assigned to those ratios that are twice as long and 0.5 assigned to the ratios that are half as long. Outlier engine 830 may then group data by the score data point to determine if a score of 2 finds similarity with other twice as long durations, which classification enables the data to provide other information that may accompany this therapy including, by way of example, a back injury.

The ratio of billed charges may also be compared to the average. A similar scoring system may be utilized where a score of 1 is assigned to those ratios that are the same as the average, a score of 2 may be assigned to those ratios that are twice as high and 0.5 assigned to the ratios that are half as much. Similarly, the ratio of the number of bills/claim to average may also be compared and scored. The measure of whether a procedure matches a diagnosis may also be compared and scored. The billed charges score may be used based on the diagnosis to determine if a given biller is consistently providing ratios that are twice as high as others.

According to one aspect, things that do not correlate may be dropped as unique situations. In a perfect scenario, collinearity may be achieved with mutually exclusive independent variables. That is duplicative variables that correlate in in their outcomes may be dropped. Outlier engine 830 may also utilize a predictive model. As is generally understood in the art, a predictive model is a model that utilizes statistics to predict outcomes. Outlier engine 830 may use a predictive model that may be embedded in workflow, for example. Such a model may include biases of end users and priorities and/or may include a leap of faith. Such a model may benefit from reuse because the model may be honed based on previous uses. The output of outlier engine 830 may be provided to the analytics of the supply chain.

Figure 10:
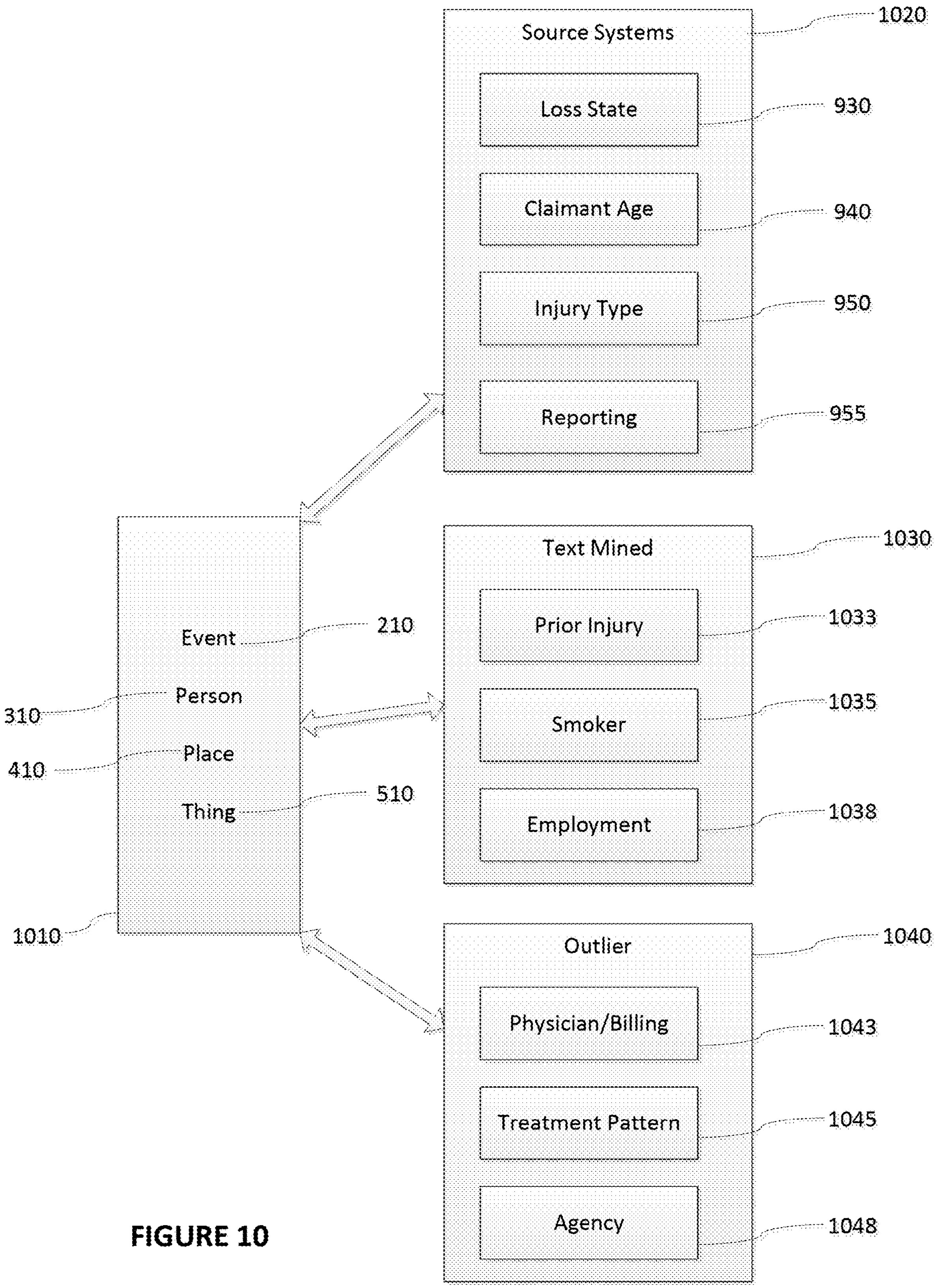
FIG. 10 illustrates predictor variables, source systems, and text mined characteristics.

Referring now also to FIG. 10, there is illustrated an example data system for the outlier engine 830. The outlier engine 830 becomes, along with the data available from source systems and characteristics derived through text mining, a source of information describing a characteristic 1010 including an event 210, person 310, place 410 and/or thing 510 that is the subject of a predictive model. Predictor variables may include source systems 1022, text mine 1030, and outlier 1040. Using claim as an example, source systems 1020 may include loss state 930, claimant age 940, injury type 950 and reporting 955 including the channel the claim was reported through such as phone, web, or attorney call, for example.

Data may be considered standard data from text mine 1030. Using claim as an example, prior injury 1033, smoking history 1035, and employment status 1038 may be included.

Outlier 1040 characteristics may also be included. Outlier 1040 may include physician/billing information 1043, such as if the physician is a 60-70% anomaly biller, treatment pattern 1045, such as if the treatment pattern is an anomaly, and the agency 1048, such as if the agency is an outlier for high loss ratio insureds.

Figure 11:
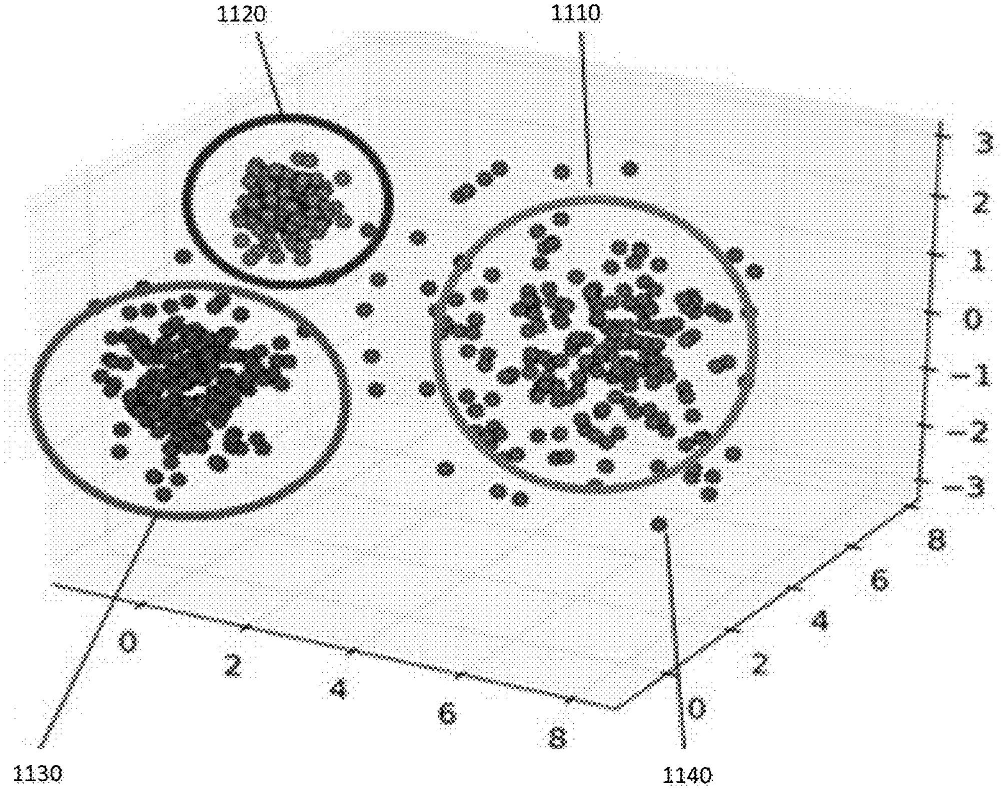
FIG. 11 illustrates the outlier engine with normative area, areas of interest and an outlier.

Referring now also to FIG. 11, outlier engine 830 is illustrated with a normative area 1110 wherein all target characteristics are typical, a first area of interest 1120 wherein there is an unusual procedure for the provider specialty and an unusual pattern of treatment for the injury, a second area of interest 1130 wherein there is an unusual number of invoices and the presence of co-morbidity/psycho-social condition, and outlier 1140 that is too far from any clump and includes a unique profile.

For example, an invoice belonging to a set may be analyzed and presented with characteristics of that invoice including doctor and treatment for example as well as the injury suffered. The axes shown in FIG. 11 may be defined by attributes of the group of invoices. Data may be grouped based on sharing attributes or qualities, like duration of treatment for an injury for example. Other data may fall in between groups as described. The groupings of data become an important attribute of the data fitting that group.

Figure 12:
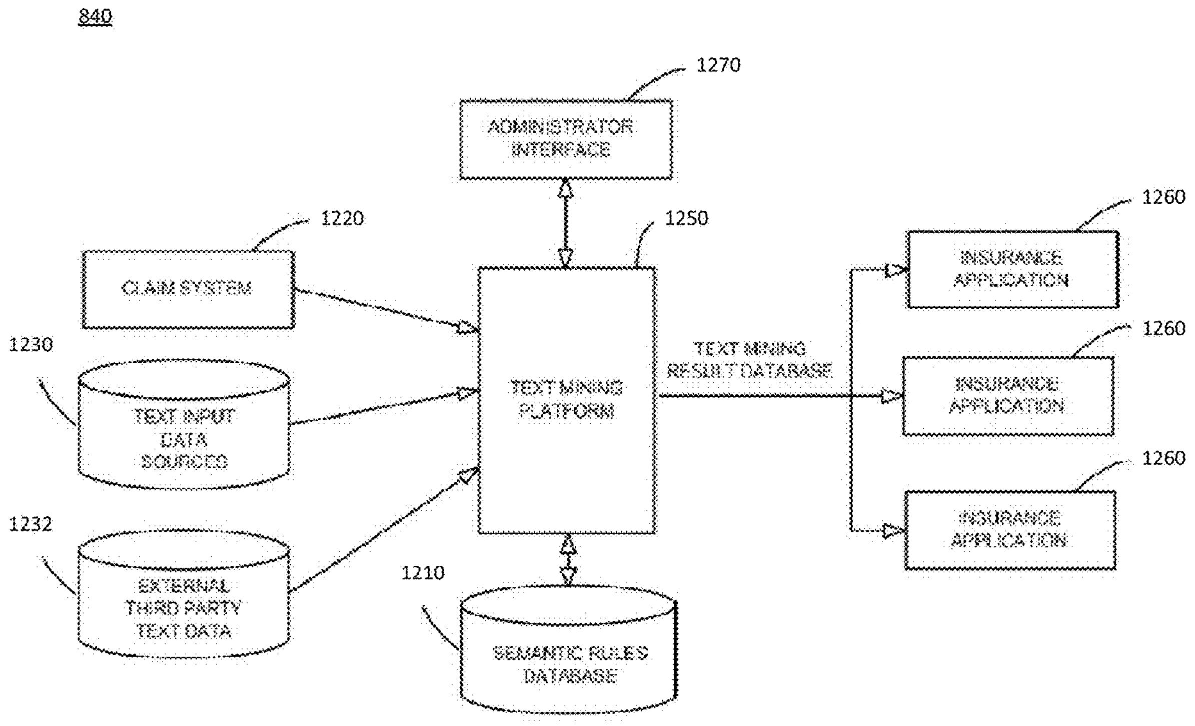
FIG. 12 illustrates a block diagram of the text factory.

Referring now also to FIG. 12, a block diagram of text factory 840 is shown. Text factory 840 includes a text mining platform 1250 that receives information from a semantic rules database 1210, a claim system 1220, one or more text input data sources 1230 (e.g., internal to an insurance enterprise), and/or external third party text data 1232 (e.g., reports issued by the National Highway Safety Board). The text mining platform 1250 might be, for example, associated with a personal computer (PC), laptop computer, an enterprise server, a server farm, and/or a database or similar storage devices. The text mining platform 1250 may, according to some embodiments, be associated with a business organization or an insurance provider.

According to some embodiments, an "automated" text mining platform 1250 may access semantic rules in the semantic rules database 1210 to mine the information from the claim system 1220 and/or the other text input data sources 1230. As used herein, the term "automated" may refer to, for example, actions that can be performed with little or no human intervention.

The text mining platform 1250 may store information into and/or retrieve information from the semantic rules database 1210 and/or a text mining result database that is output to various external insurance applications 1260 (e.g., software applications or devices associated with subrogation, fraud detection, and/or recovery factor analysis). The semantic rules database 1210 may be a locally stored relational database or reside remote from the text mining platform 1250. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical administrator interface 1270 may provide the ability to access and/or modify the semantic rules database 1210 via the text mining platform 1250. The administrator interface 1270 might, for example, let an administrator define terms, dictionaries, mapping rules, etc. associated with text mining. The data sources 1230, 1232 may be thought of as "publishers" of information to be consumed by the text mining platform 1250, and the insurance applications 1260 may be considered "subscribers" to information created by the text mining platform 1250. Moreover, note that the text mining platform 1250 may operate asynchronously and/or independently of any insurance application 1260.

Although a single text mining platform 1250 is shown in FIG. 12, any number of such devices may be included. Moreover, various devices described herein might be combined according to embodiments of the present invention. For example, in some embodiments, the text mining platform 1250 and semantic rules database 1210 might be co-located and/or may comprise a single apparatus.

Figure 13:
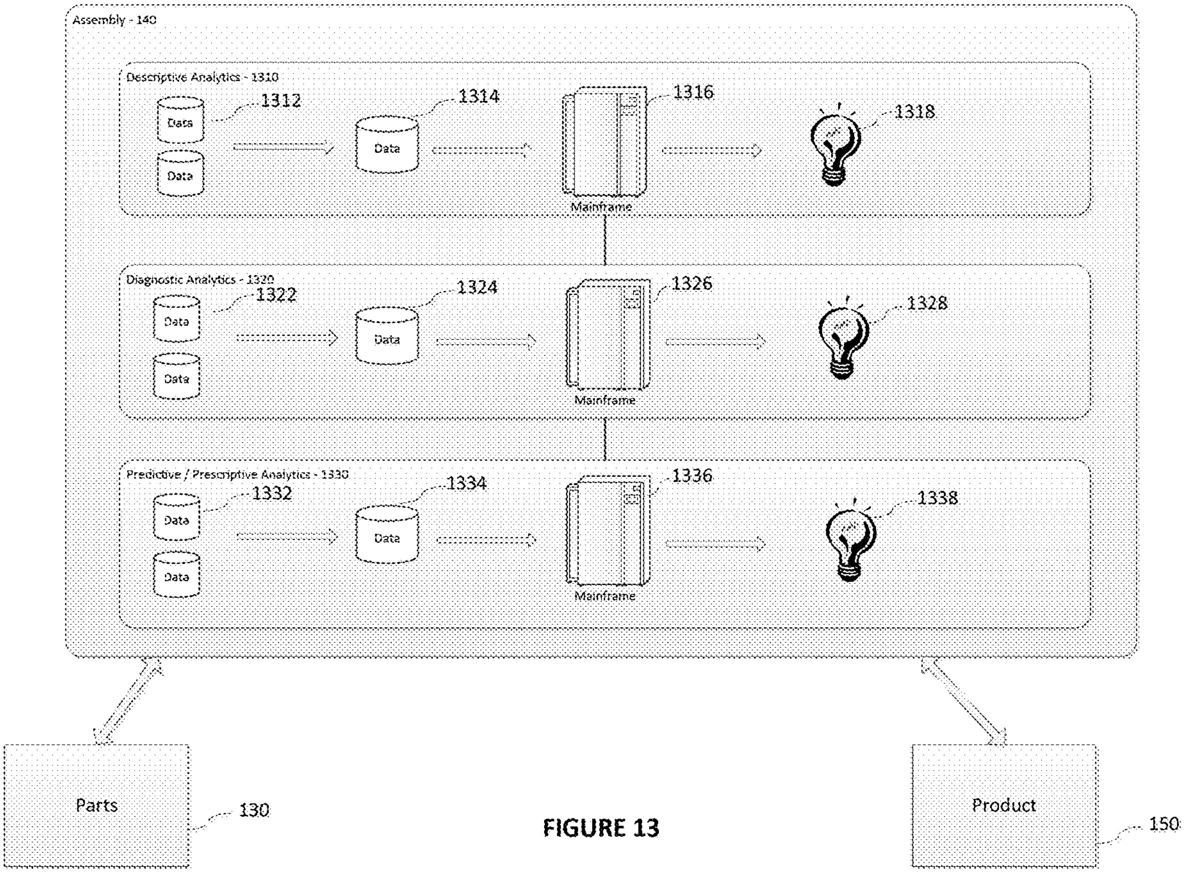
FIG. 13 illustrates the assembly of the data.

FIG. 13 illustrates the assembly 140 of the data. This includes the many levels of analytics used in business including business intelligence and data mining, optimization and simulation, and forecasting. Descriptive analytics 1310 may be used. Descriptive analytics 1310 is the business intelligence and data mining aspect of analytics and includes the management and reporting of the analytics. Generally, descriptive analytics 1310 may view data and analyze past events for insight about approaching the future. Descriptive analytics 1310 may analyze past performance by mining historical data to look at the reasons for past success and failures, such as post-mortem analysis. Descriptive models may be used to quantify relationships in data to groups by grouping portions of the data including the many different relationships that may exist within the data.

Descriptive analytics 1310 may include standard management reports and information referred to as management information systems (MIS). This reports what is and what has happened. The descriptive analytics 1310 may be metric heavy having many measures of performance of the business with a limited set of attributes used to filter and display the metrics. Common examples include daily performance dashboards, financial results reports, inventory and aging reports, scorecards of relative performance among a set of employees, partners with a shared perspective.

Specifically, FIG. 13 may include data 1312 in repositories that may be accumulated into one or a singularly accessible storage 1314 to be processed according to the descriptive analytics method on a processor or other mainframe 1316. The resulting analytics 1318 result from this processing.

Similarly, FIG. 13 may include data 1322 in repositories that may be accumulated into one or a singularly accessible storage 1324 to be processed according to the diagnostic analytics method on a processor or other mainframe 1326. The resulting analytics 1328 result from this processing.

FIG. 13 may include data 1332 in repositories that may be accumulated into one or a singularly accessible storage 1334 to be processed according to the predictive/prescriptive analytics method on a processor or other mainframe 1336. The resulting analytics 1338 result from this processing.

Figure 14:
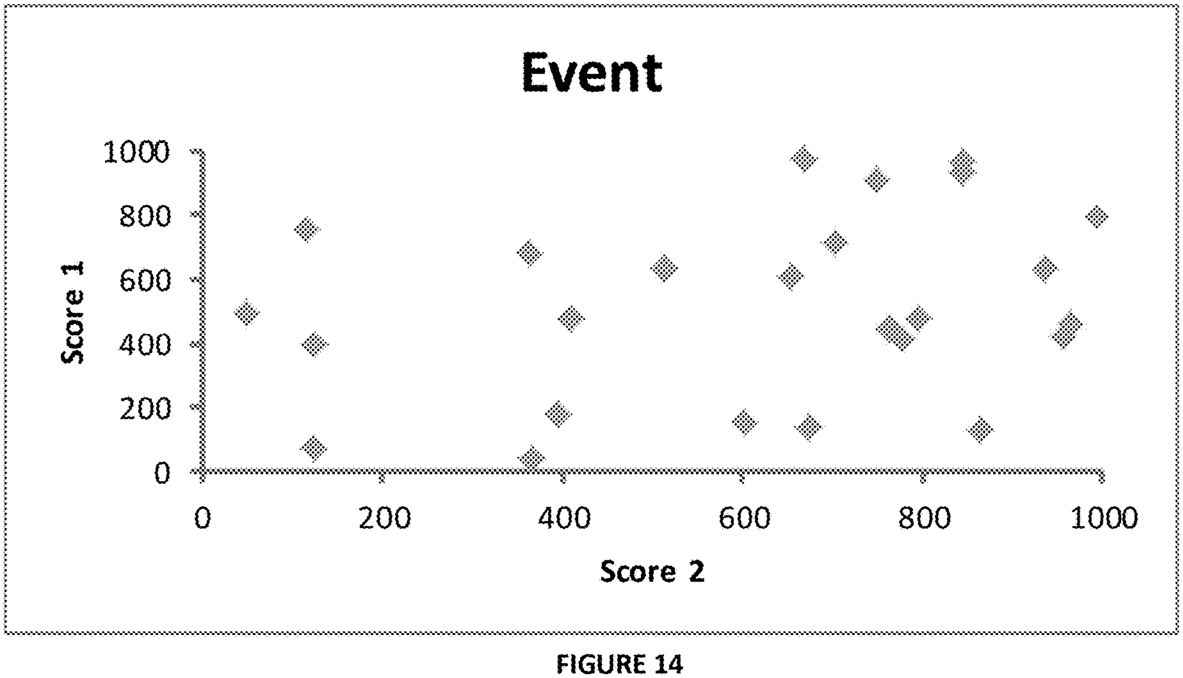
FIG. 14 illustrates a dashboard representing the relationship of scores for events.

The present system may use dashboards to represent performance by showing revenue for a given year, debt-to-equity and return on equity as well as net profit margin and gross profit margin comparisons, represent financial results report showing revenue, earnings and dividends, profitability balance sheet, cash flow, industry, and other facts, represent inventory and aging report showing invoices and balances due, and represent a scorecard of relative performance page showing signups, conversions and % visitors, by way of non-limiting examples only. Additionally, outputs and scorecards may represent other facets of the present system. For example, FIG. 14 illustrates a scorecard for events, such as events 210, for example, being plotted based on a first score, score 1, against a second score, score 2. Score 1 is illustrated as ranging from 0 to 1000. Similarly, score 2 ranges from 0 to 1000. Groupings of the events may be understood or realized using such a dashboard. Similar dashboards and scorecards may be presented for person 310, place 410, and thing 510, by way of example.

Figure 15:
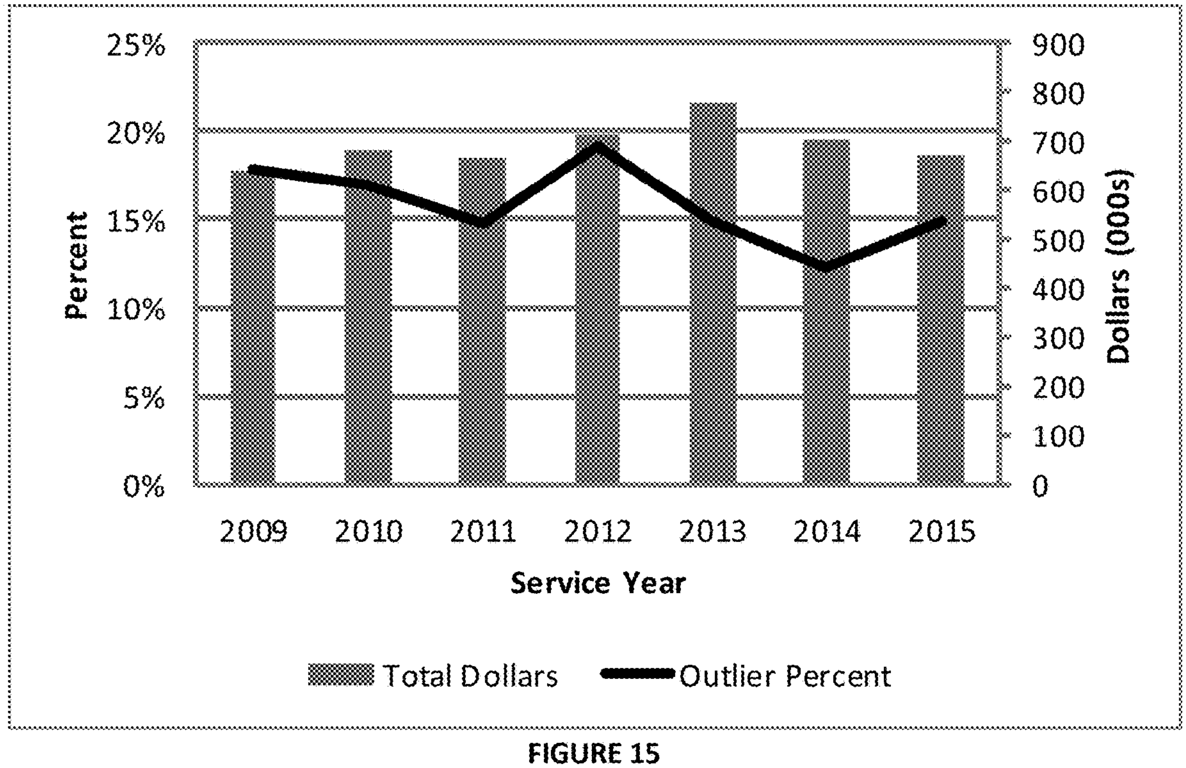
FIG. 15 illustrates a dashboard representing total dollars and outlier percentage based on year.

FIG. 15 illustrates a dashboard representing total dollars plotted against service year and includes as an overlay outlier percent by year. This dashboard may enable a relationship to be determined between outlier percent and total dollars. As would be understood, other variables may be presented in such a dashboard to enable relationship there between to be realized. One such relationship shown in FIG. 15 includes outlier percentage decreasing as total dollars increases in year 2014.

Figure 16:
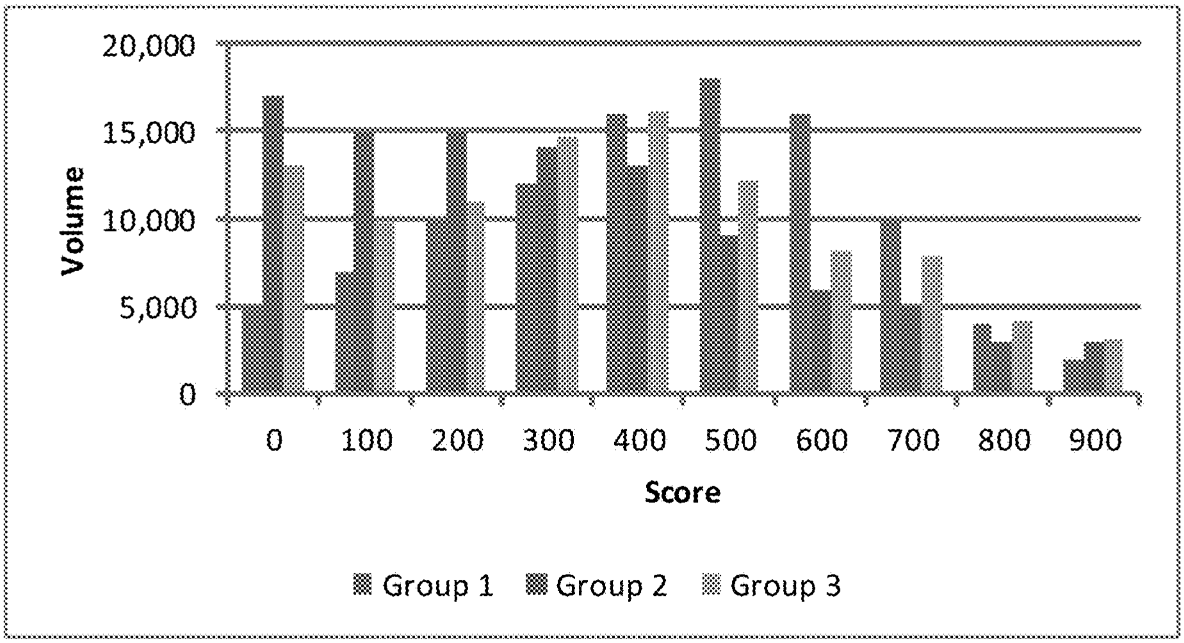
FIG. 16 illustrates a dashboard of volume of a characteristic plotted against score for selected groups.

FIG. 16 illustrates a dashboard representing volume of a characteristic 1010 plotted against score for three respective groups. In this illustration, group 1 demonstrates a bell curve of volume centered approximately centered on a score of 400. Group 2 demonstrates increased volume at lower scores. Group 3 demonstrates a fluctuating volume related to score.

Figure 17:
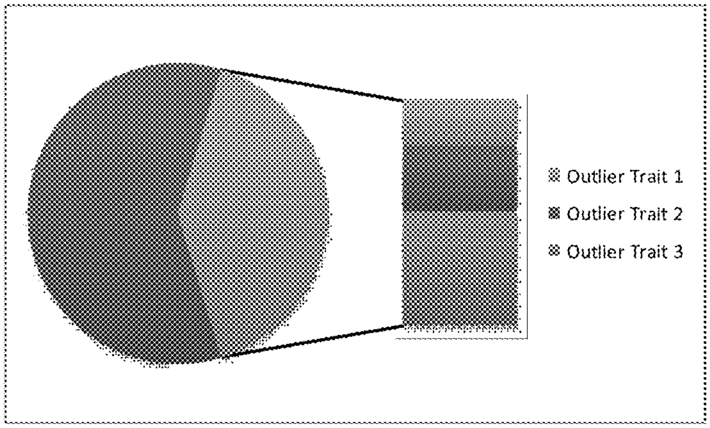
FIG. 17 illustrates a dashboard of a pie chart of outlier traits within characteristics.

FIG. 17 illustrates a dashboard of a pie chart of outlier traits. In this illustration, the pie chart is distributed between two portions represented as blue and orange. The orange portion includes three outlier traits, trait 1, trait 2, and trait 3, with trait 3 being most represented followed by trait 2 at approximately 50% of trait 3, and trait 1 at approximately 50% of trait 2.

Assembly 140 may also include diagnostic analytics 1320. Diagnostic analytics 1320 includes the "why" and "what if" aspects of the data analytics.

Assembly 140 may also include predictive and/or prescriptive analytics 1330. Predictive and/or prescriptive analytics 1330 may include the type of information that may be included to make or prevent an event. Predictive and/or prescriptive analytics 1330 may include analytics involving forecasting. Predictive and/or prescriptive analytics 1330 includes the optimization and simulation portion of the analytics.

Predictive analytics 1330 includes the processes that turn data into actionable information. Predictive analytics 1330 may use data to determine the probable future outcome of an event of the likelihood of certain things occurring. Predictive analytics 1330 may include any number of statistical techniques including modeling, machine learning, data mining, game theory where there is current and historical facts that are analyzed to make predictions about future events. This may include using models to synthesize patterns in the data to identify risks and opportunities.

Prescriptive analytics 1330 may include the synthetization of data, rules, to make predictions and provide suggestions to take advantage of the predictions. Prescriptive analytics 1330 goes beyond predictive analytics 1330 by not only predicting future outcomes but also suggesting action to leverage the predictions and identifying the implications of each decision.

Diagnostic analytics 1320 starts during the descriptive analytics 1310 and extends into predictive analytics 1330. Diagnostic analytics 1320 gets into root cause analysis and data discovery and exploration. Diagnostic analytics 1320 aids in understanding why things happened to enable improvement in business operations and processes. Diagnostic analytics 1320 provides the ability to drill down into all types of data coming from many different sources.

Figure 18:
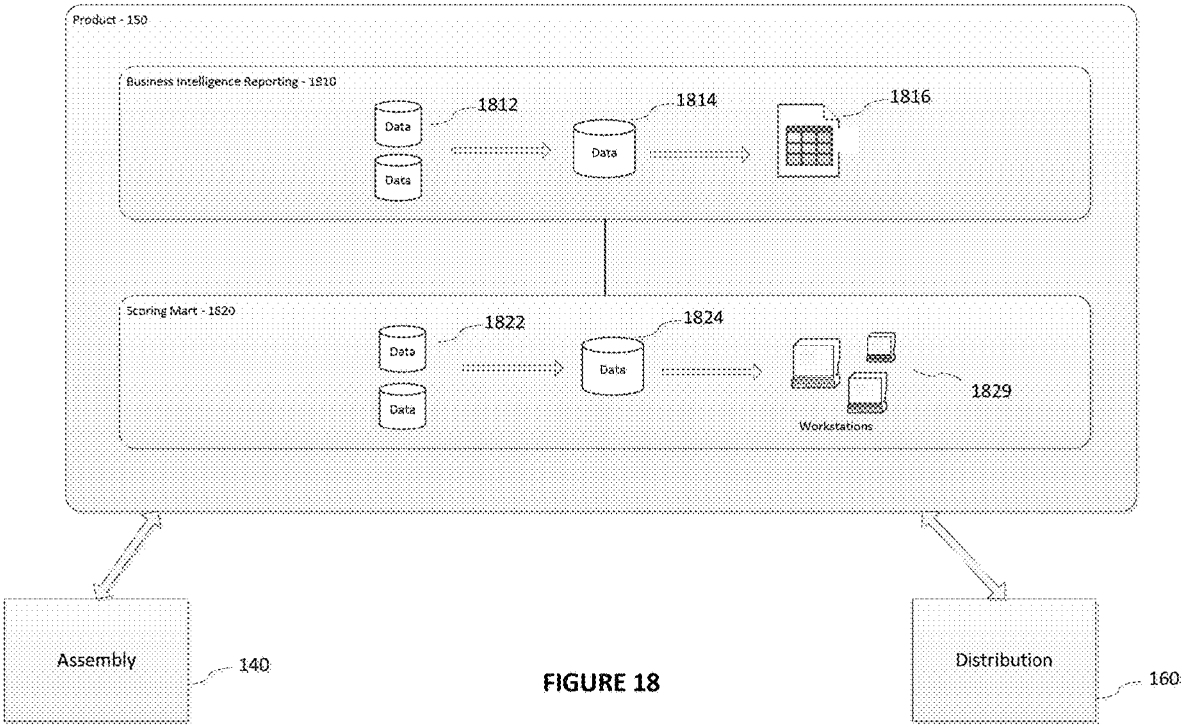
FIG. 18 illustrates the components of product.

FIG. 18 illustrates the components of product 150. Specifically, product 150 may include business intelligence (BI) reporting 1810 and scoring mart 1820.

BI reporting 1810 may include forms of human delivery reporting. BI reporting 1810 may include housing the data in data storage 1812 and accumulating the data in a singular storage 1814. The data may be provided in spreadsheets 1816 and/or other known reporting mechanisms. Spreadsheets 1816 may include other reporting that provides the business intelligence to humans, for example.

Scoring mart 1820 may contain the final output of a broad set of scoring processes used in assembly 140. This scoring mart 1820 may include the predictive/prescriptive analytics 1330 described hereinabove. Scoring mart 1820 may utilize a rules-based scoring system and may aggregate the scores summarizing from one entity to another. Scoring mart 1820 may include attributes or metadata associated with the score as will be discussed herein below.

Scoring mart 1820 may include data storage 1822 for housing data from assembly 140. The data may be accumulated within a data repository 1824 and scores may be output per queries from a database or by reporting 1829. Reporting 1829 may generally take the form of any transfer to other computers or systems.

Figure 19:
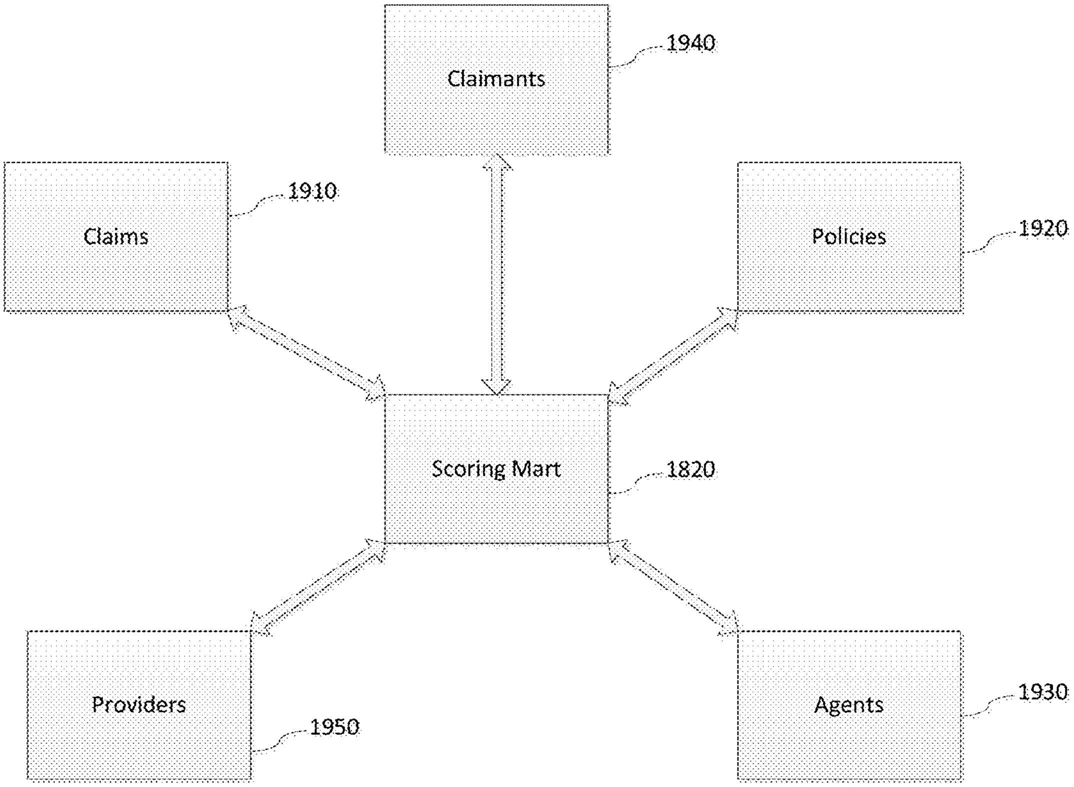
FIG. 19 illustrates exemplary items assigned a ranking in the scoring mart.

Referring now additionally to FIG. 19, which illustrates exemplary items that may be assigned a ranking in the scoring mart 1820. Items may include claims 1910, policies 1920, agents 1930, claimants 1940, and providers 1950. Scoring mart 1820 may be the repository to archive the rank of any item within the system. As an example, a fraud model may score claims 1910 based on the priority to engage a special investigator to investigate that claim for fraud, waste and abuse. Claims 1910 may be distributed based on priority, and that priority may then be converted into a score and stored in scoring mart 1820. Scoring mart 1820 may hold scores for any item that may be assigned a ranking within the present system.

Additionally, scoring mart 1820 may hold more than one score per item. For example, a fraud score may be stored for an item based on a 30 day score and another on a 3 year score, as the fraud score may be different. This may occur because the score for the first 30 days was lower because the likelihood or level of suspected fraud was low, and then the score for fraud increased as additional actions occurred over the next 3 years. The scoring mart 1820 may be used to rank doctors within the system each quester, for example. Underwriting may wish to score agencies using 12 reasons.

Figure 20:
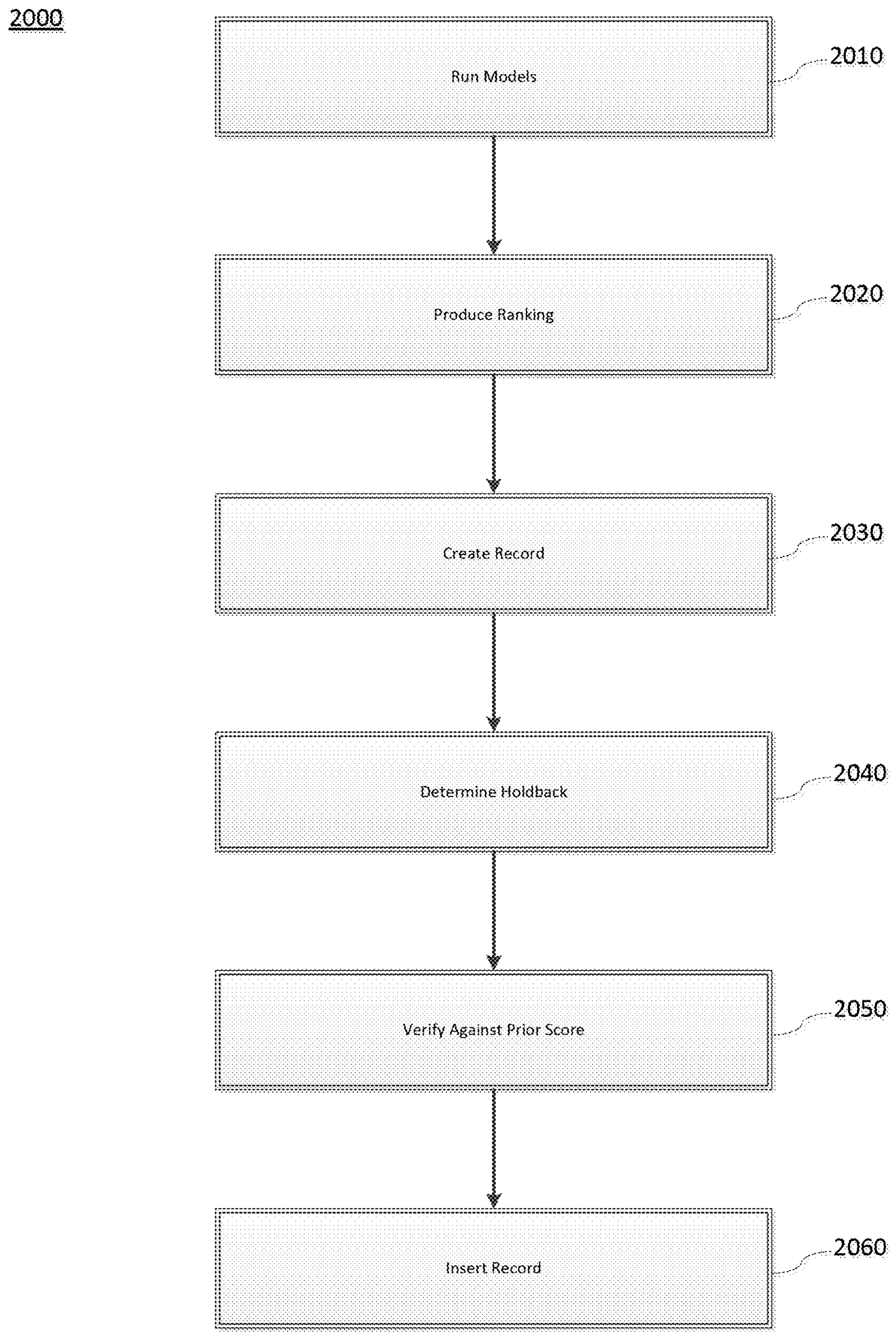
FIG. 20 illustrates a method performed in the scoring mart.

FIG. 20 illustrates a method 2000 performed in the scoring mart 1820. Method 2000 may include running models at step 2010. Once the models are run at step 2010, method 2000 may produce a ranking based on the purpose of that model at step 2020. Records are created in the scoring mart 1820 for each item scored with the date of the, the identity of what is scored, the identity of the specific scoring process, the raw score, a normalized score to simplify consumption rules, a value of whether this score is part of a holdback sample, a date range over which the score is considered to be valid at step 2030. At step 2040, method 2000 may determine what qualifies for holdback. The score may be verified against a prior score at step 2050 when the scoring mart 1820 searches its history to determine if there is a prior score for the scored item and scoring process. If the scoring mart 1820 determines there is a prior a score, that prior score may be expired as of the day prior to the new record. At step 2060, scoring mart 1820 may insert the new record with a valid date range, generally starting with the insert date and potentially have no end date.

Referring now to FIG. 21, there is illustrated a data set associated with scoring mart 1820. As shown in FIG. 21, the data may include a date of the score 2110, the model 2120, the line of business 2130, the entity type 2140, the entity identification 2150, the normalized score 2160, and the holdback 2170. The line of business 2130 may provide a tag related to the line of business being represented and the model being used. Entity type 2140 identifies the business entity associated with the score. Entity type 2140 may include the claim, policy, TIN, agency, or the like. Entity identification 2150 identifies the element that the score attaches to in the format determined by entity type 2140. Normalized score 2160 may be a score within the range 0-999. In addition, a holdback flag 2170 allowing scores to be reserved as control for measurement.

FIG. 22 illustrates an example batch lookup of scores within scoring mart 1820. As illustrated in FIG. 22, scores that meet a set of criteria may be looked up in batch. Further, those scores may be used for workflow triggers and reporting. For example, in FIG. 22, a search for all scores for line of business 2130 of worker's compensation (WC) and a model 2120 of large losses having a normalized score 2160 of a value greater than 500 not identified with a holdback 2170 may be performed. The result of a batch lookup given these parameters may be data points 2210. In this batch lookup, the other data points 2220, 2230, 2240, 2250, 2260, 2270 may not be included in the result of the batch lookup 2210, based on at least of model 2120, line of business 2130, normalized score 2160, and holdback 2170. Data points 2220, 2270 may not be included in the batch lookup result because of each of model 2220, line of business 2130, normalized score 2160 is not positively identified. Data point 2230 may not be included in the batch lookup result because the normalized score 2160 is not greater than the requested 500. Data point 2240 is not included at least because holdback 2170 is positive. Data points 2250, 2260 may not be included in the batch lookup result because normalized score 2160 is not positively identified as being greater than 500.

FIG. 23 illustrates an example batch lookup of scores within scoring mart 1820. As illustrated in FIG. 23, a search for all scores that meet a set of criteria may be looked up in real-time. Further, those scores may be used for workflow triggers and reporting. For example, in FIG. 23, a search for all scores for line of business 2130 of WC and a model 2120 of large loss having a normalized score 2160 of a value greater than 500 not identified with a holdback 2170 may be performed. The result of a real-time lookup given these parameters may be data points 2310. In this real-time lookup, the other data points 2320, 2330, 2340, 2350, 2360, 2370 may not be included in the result of the real-time lookup 2310, based on at least of model 2120, line of business 2130, normalized score 2160, and holdback 2170. Data points 2320, 2370 may not be included in the real-time lookup result because of each of model 2120, line of business 2130, normalized score 2160 is not positively identified. Data point 2330 may not be included in the real-time lookup result because the normalized score 2160 is not greater than the requested 500. Data point 2340 is not included at least because holdback 2170 is positive. Data points 2350, 2360 may not be included in the real-time lookup result because normalized score 2160 is not positively identified as being greater than 500.

FIG. 24 illustrates an aspect of scoring mart 1820 allowing identification of the "speed of change" based scores. As shown in FIG. 24, scores that exhibit a rate of change over time that is faster than a determined criterion may be identified. For example, as identified in FIG. 24, a search for all scores for line of business 2130 of WC and a model 2120 of large loss having a normalized score 2160 with a slope greater than 10 not identified with a holdback 2170 may be performed. The result in this example may include data points 2410, 2420 having identical entity identification 2150 value of 23456. Data point 2410 identifies the normalized score 2160 as a value of 400 on 6/1/2014. Data point 2420 identifies the normalized score 2160 as a value of 700 on 6/30/2014. The slope of entity identification 2150 value of 23456 may be calculated based on the equation:

$$\text{RISE/RUN}=(700-400)/(6/30/2014-6/1/2014)=300/29=10.3.$$

Since a slope of 10.3 is greater than the requested slope of 10, data points 2410, 2420 entity identification 2150 value of 23456 are returned.

FIG. 25 illustrates an aspect of scoring mart 1820 allowing a return of entities with more than one score. As shown in FIG. 25, claims that have a high score on more than one model at a time may be identified. For example, as identified in FIG. 25, a search for all claims for line of business 2130 of WC and a model 2120 of large loss having a normalized score 2160 greater than 500 and a model 2120 of fraud having a normalized score 2160 greater than 600. The result in this example may include data points 2510, 2520 having identical entity identification 2150 value of 23456. Data point 2510 includes a model 2120 of large loss having a normalized score 2160 value of 700 (greater than 500) while data point 2520 includes a model 2120 of fraud having a normalized score 2160 value of 650 (greater than 600).

FIG. 26 illustrates an aspect of scoring mart 1820 allowing the aggregation of scores from one entity onto another entity. As shown in FIG. 26, scores that exhibit a rate of change over time that is faster than a criterion may be referred. For example, as identified in FIG. 26, the normalized score 2160 of data points included in group 2610 is 250, 700, 200, 650, and 300. The average of these normalized scores 2160 is a value of 420 as shown for data point 2620. The average normalized score 2160 of a model 2120 of large loss with entity type 2140 of claims for a given policy in a time period may calculated and that normalized score 2160 may be entered as a score at the policy level, data point 2620. Similarly, although not shown, the average fraud score across all claims for an agent in a time period may be performed and that average score may be inserted as a score at the agency level.

Figure 27:
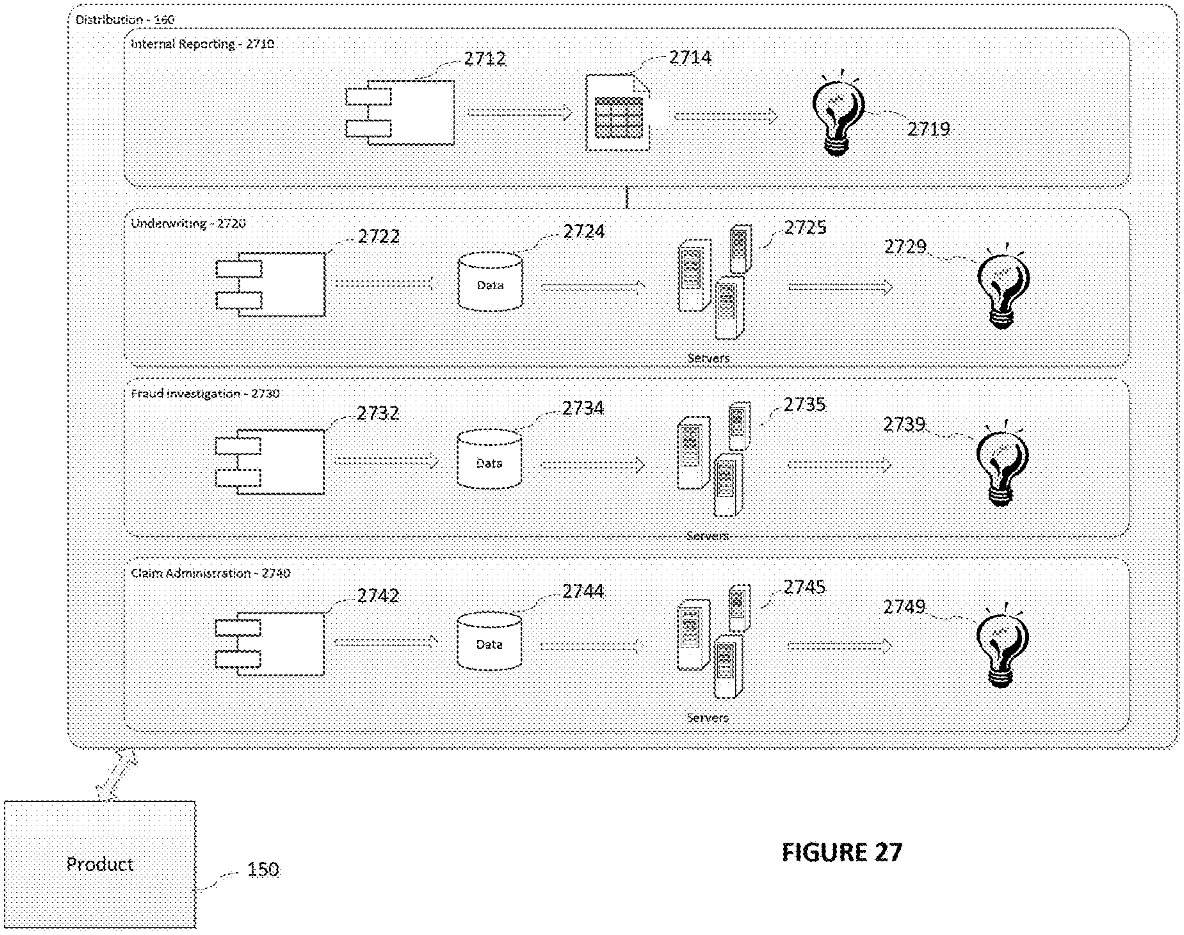
FIG. 27 illustrates the output through distribution.

FIG. 27 illustrates the output through distribution 160. Distribution 160 may include internal reporting 2710, underwriting 2720, fraud investigation 2730, and claims administration 2740.

Internal reporting 2710 may be the external interface to clients of a given business. Internal reporting 2710 may include the web interface portal of a client, for example. Alternatively or additionally, internal reporting 2710 may include representatives that work in offices and interact with potential clients.

Internal reporting 2710 may include a communications interface 2712 for transceiving data from product 150. This data may be included in a format from product 150 such as spreadsheets 2714 and/or other known reporting formats. The internal reporting 2710 may then be used to process an output 2719.

Underwriting 2720, fraud investigation 2730, and claim administration 2740 represent specific systems within a client. These systems include and represent any of a myriad of workflow platforms that may exist in a business or corporate environment. Underwriting 2720 may represent the fraud system within an insurance company. Fraud investigation 2730 may represent the underwriting system found within an insurance company. Claim administration 2740 represents the claims handling system found within an insurance company.

Underwriting 2720 may include an interface 2722 for transceiving information with product 150. This information may then be stored in a storage unit 2724. Processors 2725 may act on the stored data and output underwriting conclusions 2729.

Fraud investigation 2730 may include an interface 2732 for transceiving information with product 150. This information may then be stored in a storage unit 2734. Processors 2735 may act on the stored data and output Fraud conclusions 2739.

Claim administration 2740 may include an interface 2742 for transceiving information with product 150. This information may then be stored in a storage unit 2744. Processors 2745 may act on the stored data and output claim administration 2749.

Figure 28:
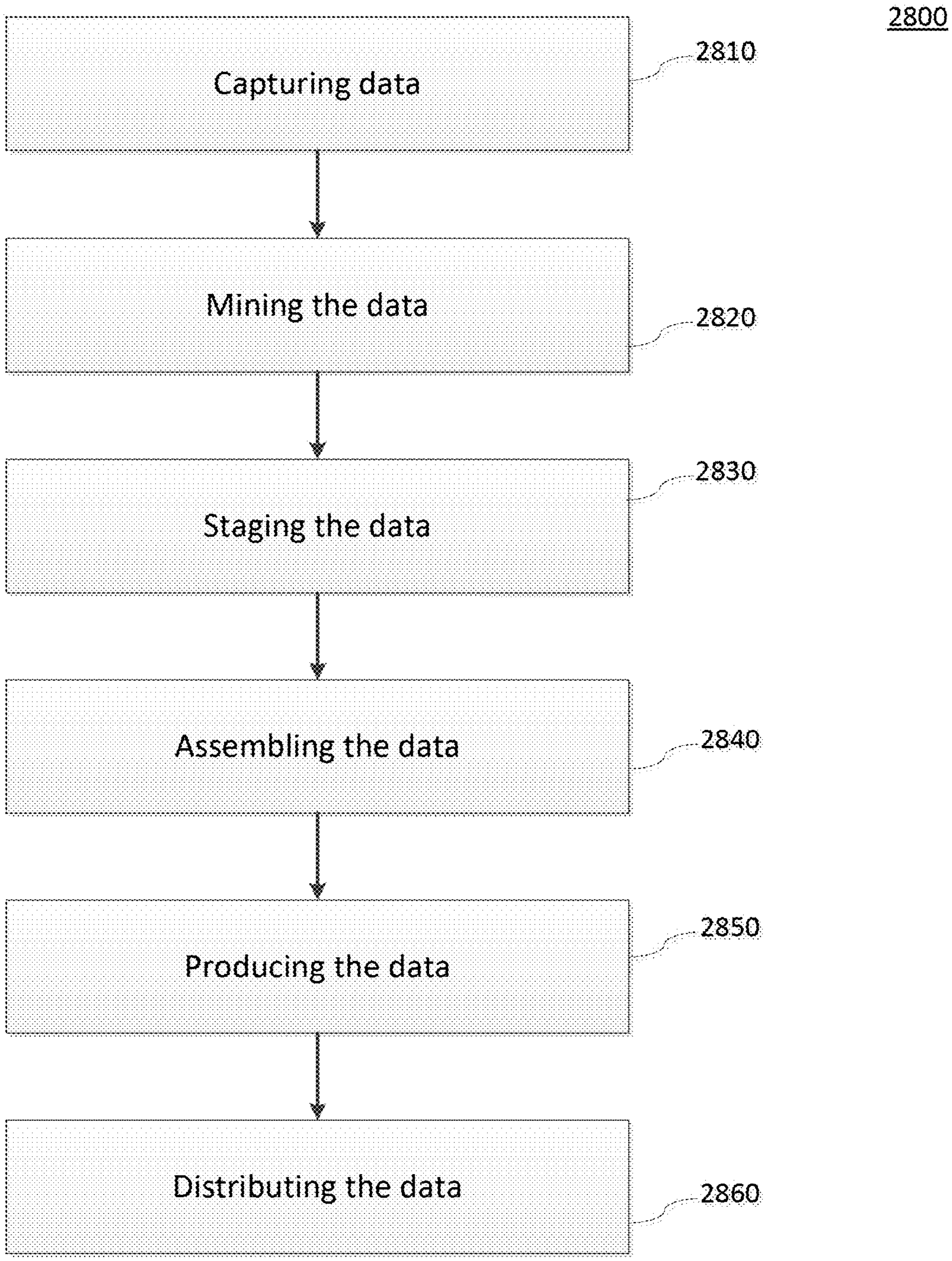
FIG. 28 illustrates a method performed in an insight supply chain.

FIG. 28 illustrates a method 2800 performed in an insight supply chain. Method 2800 includes capturing data at step 2810. This data may be data used within an organization and may be stored within the computer systems of the organization. Data may also include information gleaned during method 2800, for example. This data may be housed within a data warehouse, a data lake, or even provided by a third party.

Method 2800 may also include mining the data at step 2820. The mining of the data 2820 is the heavy industry of determining the contents of the data. Mining the data 2820 may include traditional data mining techniques, machine learning and text mining, for example.

Method 2800 may include staging the data at step 2830. Staging the data may include reorganizing the data to accelerate the use of the data or the analytics performed on the data. This may include an analytical data mart (ADM), an outlier engine, and a text factory. Staging the data at step 2830 is the data management step of method 2800.

Method 2800 may include assembling the data at step 2840. Assembling at step 2840 may include performing analytics on the data.

Method 2800 may include producing the data at step 2850. Producing the data at step 2850 may include reporting the data, including traditional human delivery reporting, or providing the data in a scoring mart.

Method 2800 may include distributing the data at step 2860. Distributing at step 2860 may include reporting the SharePoint or self-help, or providing the information to the myriad of workflow platforms included within the business organization, such as a fraud system, underwriting system, and claims handling system.

As used herein, devices, such as the score mart and outlier engine and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Figure 29:
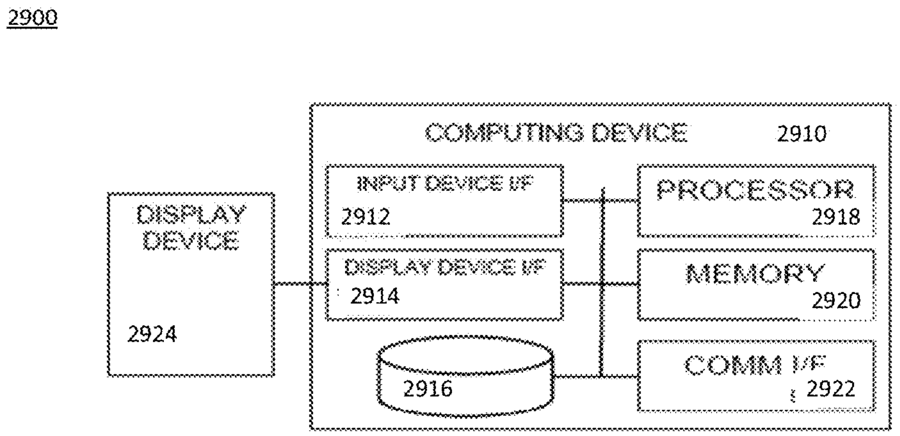
FIG. 29 illustrates an example computing device that may be used to implement features described herein with reference to FIGS. 1-28.

FIG. 29 shows an example computing device 2910 that may be used to implement features describe above with reference to FIGS. 1-28. The computing device 2910 includes a processor 2918, memory device 2920, communication interface 2922, peripheral device interface 2912, display device interface 2914, and storage device 2916. FIG. 29 also shows a display device 2924, which may be coupled to or included within the computing device 2910.

The memory device 2920 may be or include a device such as a Dynamic Random Access Memory (D-RAM), Static RAM (S-RAM), or other RAM or a flash memory. The storage device 2916 may be or include a hard disk, a magneto-optical medium, an optical medium such as a CD-ROM, a digital versatile disk (DVDs), or Blu-Ray disc (BD), or other type of device for electronic data storage.

The communication interface 2922 may be, for example, a communications port, a wired transceiver, a wireless transceiver, and/or a network card. The communication interface 2922 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 2912 may be an interface configured to communicate with one or more peripheral devices. The peripheral device interface 2912 may operate using a technology such as Universal Serial Bus (USB), PS/2, Bluetooth, infrared, serial port, parallel port, and/or other appropriate technology. The peripheral device interface 2912 may, for example, receive input data from an input device such as a keyboard, a mouse, a trackball, a touch screen, a touch pad, a stylus pad, and/or other device. Alternatively or additionally, the peripheral device interface 2912 may communicate output data to a printer that is attached to the computing device 2910 via the peripheral device interface 2912.

The display device interface 2914 may be an interface configured to communicate data to display device 2924. The display device 2924 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 2914 may operate using technology such as Video Graphics Array (VGA), Super VGA (S-VGA), Digital Visual Interface (DVI), High-Definition Multimedia Interface (HDMI), or other appropriate technology. The display device interface 2914 may communicate display data from the processor 2918 to the display device 2924 for display by the display device 2924. As shown in FIG. 29, the display device 2924 may be external to the computing device 2910, and coupled to the computing device 2910 via the display device interface 2914. Alternatively, the display device 2924 may be included in the computing device 2900.

An instance of the computing device 2910 of FIG. 29 may be configured to perform any feature or any combination of features described above as performed. In such an instance, the memory device 2920 and/or the storage device 2916 may store instructions which, when executed by the processor 2918, cause the processor 2918 to perform any feature or any combination of features described above as performed. Alternatively or additionally, in such an instance, each or any of the features described above may be performed by the processor 2918 in conjunction with the memory device 2920, communication interface 2922, peripheral device interface 2912, display device interface 2914, and/or storage device 2916.

Figure 30:
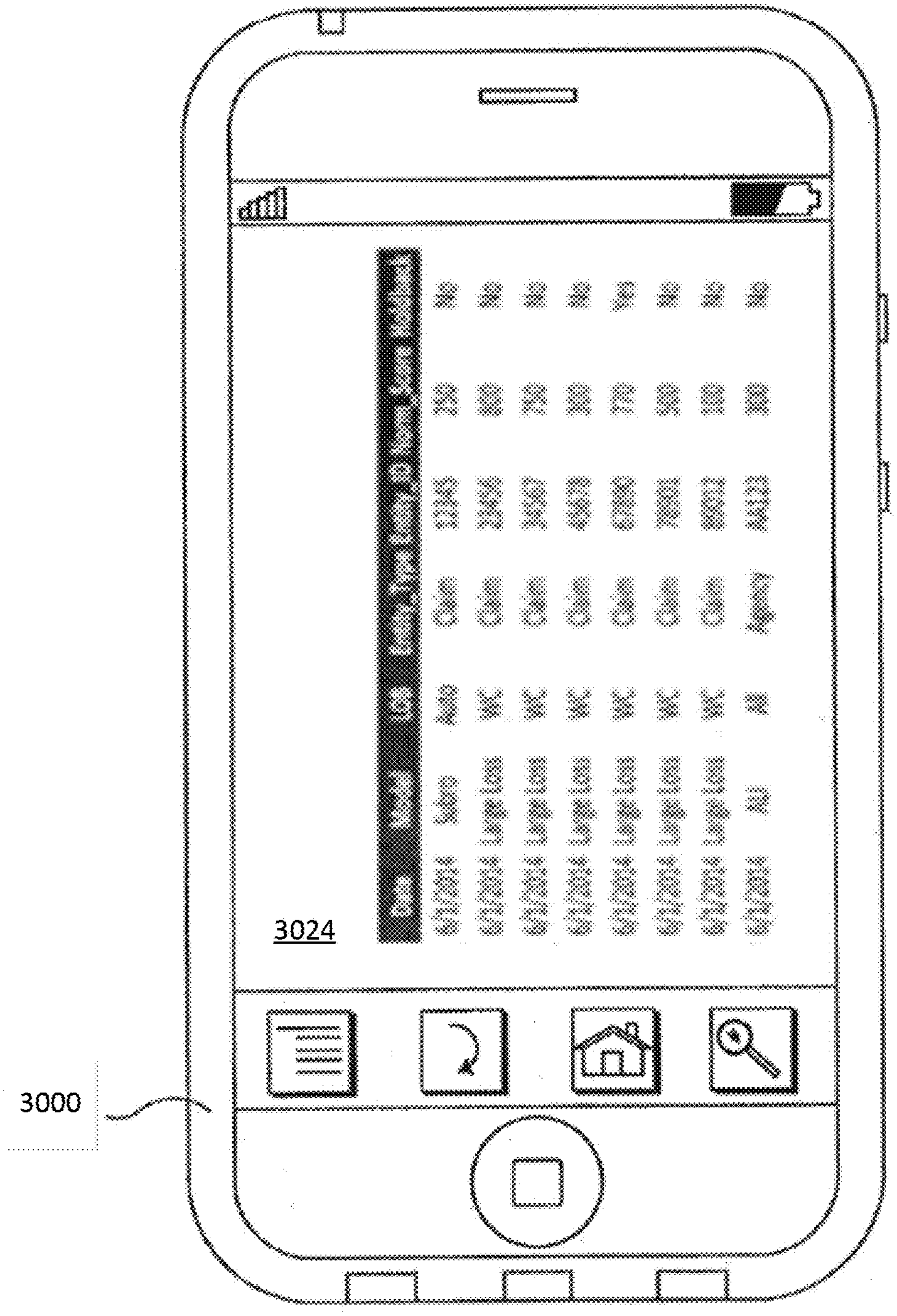
FIG. 30 illustrates a mobile device that is a more specific example of the computing device of FIG. 29.

FIG. 30 shows a mobile device 3000 that is a more specific example of the computing device 2910 of FIG. 29. The mobile device 3000 may include a processor (not depicted), memory device (not depicted), communication interface (not depicted), peripheral device interface (not depicted), display device interface (not depicted), storage device (not depicted), and touch screen display 3024, which may possess characteristics of the processor 2918, memory device 2920, communication interface 2922, peripheral device interface 2912, display device interface 2914, storage device 2916, and display device 2924, respectively, as described above with reference to FIG. 29. The touch screen display 3024 may receive user input using technology such as, for example, resistive sensing technology, capacitive sensing technology, optical sensing technology, or any other appropriate touch-sensing technology. As shown in FIG. 30, the touch screen display 3024 may display a notification/alert document, with characteristics of any or any combination of documents described above with reference to FIGS. 1-28. The touch screen display 3024 may receive input from a user of the mobile device 3000, for filling in a notification/alert document shown in the touch screen display 3024.

Referring again to FIG. 29, an instance of the computing device 2910 may alternatively or additionally be configured to perform any feature or any combination of features described above as performed. In such an instance, the memory device 2920 and/or the storage device 2916 may store instructions which, when executed by the processor 2918, cause the processor 2918 to perform any feature or any combination of features. In such an instance, the processor 2918 may perform the feature or combination of features in conjunction with the memory device 2920, communication interface 2922, peripheral device interface 2912, display device interface 2914, and/or storage device 2916.

Alternatively or additionally, an instance of the computing device 2910 may be configured to perform any feature or any combination of features described above as performed. In such an instance, the memory device 2920 and/or the storage device 2916 may store instructions which, when executed by the processor 2918, cause the processor 2918 to perform any feature or any combination of features described above as performed. In such an instance, the processor 2918 may perform the feature or combination of features in conjunction with the memory device 2920, communication interface 2922, peripheral device interface 2912, display device interface 2914, and/or storage device 2916.

Alternatively or additionally, an instance of the computing device 2910 may be configured to perform any feature or any combination of features described above as performed. In such an instance, the memory device 2920 and/or the storage device 2916 may store instructions which, when executed by the processor 2918, cause the processor 2918 to perform any feature or any combination of features described above as performed. In such an instance, the processor 2918 may perform the feature or combination of features in conjunction with the memory device 2920, communication interface 2922, peripheral device interface 2912, display device interface 2914, and/or storage device 2916.

Although FIG. 29 shows that the computing device 2910 includes a single processor 2918, single memory device 2920, single communication interface 2922, single peripheral device interface 2912, single display device interface 2914, and single storage device 2916, the computing device may include multiples of each or any combination of these components 2918, 2920, 2922, 2912, 2914, 2916, and may be configured to perform, mutatis mutandis, analogous functionality to that described above.

As used to herein, the term "document" broadly refers to and is not limited to a paper document, an electronic file defining a paper document, a social media post, an SMS, an email, or any electronic medium of communication used to deliver a message.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although the methods and features described above with reference to FIGS. 1-18 are described above as performed using the system 100 of FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-18 may be used alone without the other features and elements or in various combinations with or without other features and elements. Sub-elements of the methods and features described above with reference to FIGS. 1-18 may be performed in any arbitrary order (including concurrently), in any combination or sub-combination.

What is claimed is:

1. A device for automatically grouping data based on characteristics, the device comprising:

a communication interface configured to receive data from a plurality of different data sources, at least one of the plurality of different data sources being an external source and at least one of the plurality of different data sources being an internal source;

a storage medium configured to store the received data;

a processor configured to:

correlate selected parameters included within the received data, wherein the correlated selected parameters include at least derived characteristics of the received data based on relationships with other data; and analyze the received data using the correlated selected parameters to model the received data by identifying attributes associated with particular groups of data based on the groupings of attributes and relative separation of an attribute grouping from typical groupings of those attributes when spatially graphed to identify data points having common attributes, wherein the attributes are indicative of at least an event, a person, a place, and a thing; and the communication interface further configured to:

input the correlated selected parameters included within the received data and the identified data points having common attributes as additional data sources of the plurality of data sources for further analytical modeling; and output results of the further analytical modeling including the correlations and the identified data points to at least one of internal reporting, underwriting, fraud investigation, and claims administration, wherein the outputted correlations and the identified data points improve at least one of internal reporting, underwriting an insurance determination to a client, fraud investigation, and claims administration, and wherein the improvement in underwriting includes at least one underwriting decision, the improvement in fraud investigation includes at least one claim to be investigated for fraud, and the improvement in claims administration includes at least one claim result.

2. The device of claim 1, wherein the analysis includes plotting the received data in a multivariate form to identify groupings of data points.

3. The device of claim 1, wherein the analysis identifies and derives parameters within the received data according to a type of data.

4. The device of claim 1, wherein the received data is related to a loss or a claim in an insurance industry.

5. The device of claim 4, wherein the loss or the claim includes a loss state, a claimant age, an injury type, or a type of reporting of an injury.

6. The device of claim 4, wherein the loss or the claim includes physician billing or treatment patterns.

7. The device of claim 1, wherein the received data includes a benchmark comparison and identifies a difference from a benchmark.

8. The device of claim 1, wherein the analysis includes predictor variables.

9. The device of claim 8, wherein the predictor variables include source systems, text mined data, and outlier data.

10. The device of claim 1, wherein at least one action is generated on the received data based on inclusion in or exclusion from a group.

11. The device of claim 1, wherein further analysis is performed on the received data with identified attributes associated with a particular group.

12. A computerized method for automatically grouping data based on characteristics, the method comprising:

receiving, by a processor via a communication interface, data from a plurality of different data sources, at least one of the plurality of different data sources being an external source and at least one of the plurality of data sources being an internal source;

storing, by the processor, the received data in a storage medium;

correlating, by the processor, selected parameters included within the received data, wherein the correlated selected parameters include at least derived characteristics of the received data based on relationships with other data:

analyzing, by the processor, the received data using the correlated selected parameters to model the received data by identifying attributes associated with particular groups of data based on groupings of attributes and relative separation of an attribute grouping from typical groupings of those attributes when spatially graphed to identify data points having common attributes, wherein the attributes are indicative of at least an event, a person, a place, and a thing;

inputting, by the processor via the communication interface, the correlated selected parameters included within the received data and the identified data points having common attributes as additional data sources of the plurality of data sources for further analytical modeling; and outputting, by the processor, results of the further analytical modeling including the correlations and the identified data points to at least one of internal reporting, underwriting, fraud investigation, and claims administration, wherein the outputted correlations and the identified data points improve at least one of internal reporting, underwriting an insurance determination to a client, fraud investigation, and claims administration, and wherein the improvement in underwriting includes an output via the communication interface of at least one underwriting decision, the improvement in fraud investigation includes an output via the communication interface of at least one claim to be investigated for fraud, and the improvement in claims administration includes an output via the communication interface of at least one claim result.

13. The method of claim 12, wherein the analysis includes plotting the received data in a multivariate form to identify groupings of data points.

14. The method of claim 12, wherein the analysis identifies and derives parameters within the received data according to a type of data.

15. The method of claim 12, wherein the received data is related to a loss or a claim in an insurance industry.

16. The method of claim 15, wherein the loss or the claim includes a loss state, a claimant age, an injury type, or a type of reporting of an injury.

17. The method of claim 15, wherein the loss or the claim includes physician billing or treatment patterns.

18. The method of claim 12, wherein the received data includes a benchmark comparison and identifies a difference from a benchmark.

19. The method of claim 12, wherein the analysis includes predictor variables.

20. The method of claim 19, wherein the predictor variables include source systems, text mined data, and outlier data.

21. The method of claim 12, wherein at least one action is generated on the received data based on inclusion in or exclusion from a group.

22. The method of claim 12, wherein further analysis is performed on the received data with identified attributes associated with a particular group.

23. A non-transitory computer readable medium having stored thereon instructions that, when executed by a processor, cause the processor to perform operations comprising:

receiving data from a plurality of different data sources, at least one of the plurality of different data sources being an external source and at least one of the plurality of data sources being an internal source;

storing the received data in a storage medium;

correlating selected parameters included within the received data, wherein the correlated selected parameters include at least derived characteristics of the received data based on relationships with other data;

analyzing, by the processor, the received data using the correlated selected parameters to model the received data by identifying attributes associated with particular groups of data based on groupings of attributes and relative separation of an attribute grouping from typical groupings of those attributes when spatially graphed to identify data points having common attributes, wherein the attributes are indicative of at least an event, a person, a place, and a thing;

inputting the correlated selected parameters included within the received data and the identified data points having common attributes as additional data sources of the plurality of data sources for further analytical modeling; and outputting results of the further analytical modeling including the correlations and the identified data points to at least one of internal reporting, underwriting, fraud investigation, and claims administration, wherein the outputted correlations and the identified data points improve at least one of internal reporting, underwriting an insurance determination to a client, fraud investigation, and claims administration, and wherein the improvement in underwriting includes an output via the communication interface of at least one underwriting decision, the improvement in fraud investigation includes an output via the communication interface of at least one claim to be investigated for fraud, and the improvement in claims administration includes an output via the communication interface of at least one claim result.

24. The non-transitory computer readable medium of claim 23, wherein the analysis includes plotting the received data in a multivariate form to identify groupings of data points.

25. The non-transitory computer readable medium of claim 23, wherein the analysis identifies and derives parameters within the received data according to a type of data.

26. The non-transitory computer readable medium of claim 23, wherein the received data is related to a loss or a claim in an insurance industry, wherein the loss or the claim includes a loss state, a claimant age, an injury type, a type of reporting of an injury, physician billing, or treatment patterns.

27. The non-transitory computer readable medium of claim 23, wherein the received data includes a benchmark comparison and identifies a difference from a benchmark.

28. The non-transitory computer readable medium of claim 23, wherein the analysis includes predictor variables, wherein the predictor variables include source systems, text mined data, and outlier data.

29. The non-transitory computer readable medium of claim 23, wherein at least one action is generated on the received data based on inclusion in or exclusion from a group, and wherein further analysis is performed on the received data with identified attributes associated with a particular group.

* * * * *